(12) United States Patent
Rajapaske

(10) Patent No.: US 8,588,984 B2
(45) Date of Patent: Nov. 19, 2013

(54) ROTOR ANGLE STABILITY PREDICTION USING POST DISTURBANCE VOLTAGE TRAJECTORIES

(76) Inventor: Athula Dayanarth Rajapaske, Winnipeg (CA)

( * ) Notice: Subject to any disclaimer, the term of this patent is extended or adjusted under 35 U.S.C. 154(b) by 618 days.

(21) Appl. No.: 12/837,048

(22) Filed: Jul. 15, 2010

(65) Prior Publication Data

US 2011/0022240 A1 Jan. 27, 2011

Related U.S. Application Data

(60) Provisional application No. 61/227,996, filed on Jul. 23, 2009.

(51) Int. Cl.
*G05D 5/00* (2006.01)
*G05D 11/00* (2006.01)
*G05D 17/00* (2006.01)

(52) U.S. Cl.
USPC .............................. 700/286; 700/287; 322/20

(58) Field of Classification Search
USPC .......... 700/287, 293, 286; 322/37, 20; 703/13
See application file for complete search history.

(56) References Cited

U.S. PATENT DOCUMENTS

| | | | | |
|---|---|---|---|---|
| 5,483,462 A * | 1/1996 | Chiang | ......................... | 700/293 |
| 5,719,787 A * | 2/1998 | Chiang et al. | ................. | 700/293 |
| 7,761,402 B2 * | 7/2010 | Chiang et al. | ................... | 706/62 |
| 8,130,085 B2 * | 3/2012 | Noh | .......................... | 340/12.32 |
| 2006/0190227 A1 * | 8/2006 | Chiang et al. | ................... | 703/13 |
| 2010/0324844 A1 * | 12/2010 | Marti | ............................. | 702/61 |

* cited by examiner

*Primary Examiner* — Julio Gonzalez
(74) *Attorney, Agent, or Firm* — Ryan W. Dupuis; Kyle R. Satterthwaie; Ade & Company Inc.

(57) ABSTRACT

A new method for predicting the rotor angle stability status of a power system immediately after a large disturbance is presented. The proposed two stage method involves estimation of the similarity of post-fault voltage trajectories of the generator buses after the disturbance to some pre-identified templates and then prediction of the stability status using a classifier which takes the similarity values calculated at the different generator buses as inputs. The typical bus voltage variation patterns after a disturbance for both stable and unstable situations are identified from a database of simulations using fuzzy C-means clustering algorithm. The same database is used to train a support vector machine classifier which takes proximity of the actual voltage variations to the identified templates as features.

19 Claims, 20 Drawing Sheets

ROTOR ANGLE STABILITY PREDICTION USING POST DISTURBANCE VOLTAGE TRAJECTORIES

This application claims the benefit under 35 U.S.C. 119(e) of U.S. provisional application Ser. No. 61/227,996, filed Jul. 23, 2009.

FIELD OF THE INVENTION

The present invention relates to a system and method for monitoring a stability condition in a power system comprising a plurality of generator buses by evaluating a trajectory of the voltage magnitude of each generator bus following a detected fault condition.

BACKGROUND

Power systems are designed to be able to adjust to various disturbances such as faults, large changes in loads or loss of generation and continue to operate satisfactorily within the desired bounds of voltage and frequency [1]. However, they are not designed to be immune to all possible events; unexpected events can happen in the system leading to rotor angle, frequency or voltage instability [2]. The rotor angle instability may be initiated either by a small disturbance to the system such as a change in load or a large disturbance such as a fault in the system. The large disturbance rotor angle instability (which is also commonly referred to as transient instability) usually appears as aperiodic angular separation due to insufficient synchronizing torque, manifesting as the first swing instability. However, in large power systems it is also possible that the transient instability occurs in the later swings, mainly related to a lack of sufficient damping torque [3] [4].

Protection against rotor angle instability or loss of synchronism, which is also referred to as out-of-step protection is often provided using distance relays [5]. Effectiveness of such local measurement based out-of-step protection systems is limited in minimizing the effects of system wide disturbances [1]. In order to overcome these disadvantages, several utilities have developed wide area protection schemes referred to as special protection systems (SPSs) or remedial action schemes (RASs). These systems are mostly event based systems designed to directly detect selected outages that would lead to instability using binary (transfer trip) signals and take predetermined corrective actions [5]-[7]. This method has been adopted mainly because of the very short response time required for avoiding transient instability [6]. However, implementation of event based special protection systems can be extremely complex, cumbersome and expensive [6], [7]; this is because a large number of tele-protection systems are needed to convey all relevant system contingencies to the stations that must execute corrective actions. They need to be continuously armed and de-armed with the changing system conditions [5].

In contrast, response based wide area protection and control systems employ strategically placed sensors, such as phasor measurement units (PMUs), that react to the power system response to arbitrary disturbances [6]-[7]. Managing of such systems is much simpler than comparable event based systems. The capabilities of PMU technology, telecommunications and real-time data processing are approaching a level that is acceptable for implementing response based protection and control against large disturbance rotor angle instability; generally a response time of the order of 1 s is required [6].

In one of the earliest schemes of wide area measurements based out-of-step protection, Tokyo Electric Power Co. (TEPCO) used the measured phase angle difference between two groups of generators to predict the future phase angle difference values and perform controlled system separation if the predicted phase difference exceeds a threshold [10]. The Western Area stability and voltage Control System (WACS) implemented on the Bonneville Power Administration (BPA) system uses the time integral of the weighted average of 12 voltage magnitude measurements on the 500 kV network as a measure of instability. Control actions such as capacitor or reactor bank switching and generator tripping are activated when this integral exceeds certain preset thresholds [7]. An alternative algorithm of the same system uses generator reactive power measurements as additional inputs to the controller and uses a fuzzy logic system to determine final control actions [7].

Some recent studies have shown that machine learning techniques can be applied to rotor angle instability protection problems [4][7][11][12]. In [11], the oscillations seen after clearing a severe fault are represented using an autoregressive model for which the input is the voltage phase differences between substations. The stability status of the system is determined by analyzing the roots of the pulse transfer function of the online identified autoregressive model. An array of neural networks (NNs) was used in [4] to predict unstable oscillations between groups of two generators. These NNs take phase angle difference between the two generator buses and its rate of change as inputs. The outputs of the NNs are processed through a voting procedure to determine the transient stability status of the system. Despite the limited success of these schemes, systematic approaches for designing wide area protection and control systems against the large disturbance rotor angle instability is a necessity.

SUMMARY OF THE INVENTION

According to one aspect of the invention there is provided a method of monitoring a rotor angle stability condition in a power system comprising a plurality of generator buses, the method comprising:

estimating a trajectory of a voltage magnitude for each of the generator buses;

providing a database of stable templates and unstable templates in which the stable templates represent typical bus voltage magnitude variation patterns following a disturbance resulting in stable situations and the unstable templates represent typical bus voltage magnitude variation patterns following a disturbance resulting in unstable situations;

calculating a similarity value for each trajectory representing a similarity of the trajectory to the respective templates; and evaluating a combination of the calculated similarity values for a plurality of the generator buses to determine that the rotor angle stability condition of the power system is stable if the trajectories of the generator buses are similar to stable templates and to determine that the rotor angle stability condition of the power system is unstable if the trajectories of the generator buses are similar to unstable templates.

The proposed two stage method for predicting the rotor angle stability status of a power system immediately after a large disturbance involves estimation of the similarity of post-fault voltage trajectories of the generator buses after the disturbance to some pre-identified templates and then prediction of the stability status using a classifier which takes the similarity values calculated at the different generator buses as inputs. The typical bus voltage variation patterns after a disturbance for both stable and unstable situations are identified from a database of simulations using fuzzy C-means clustering algorithm. The same database is used to train a support vector machine classifier which takes proximity of the actual voltage variations to the identified templates as features. Development of the system and its performance were demonstrated using a case study carried out on the IEEE-39 bus system. Investigations showed that the proposed method can accurately predict the stability status six cycles after the clearance of a fault. Further, the robustness of the proposed method was examined by analyzing its performance in predicting the instability when the network configuration is altered.

This method could be used as the basis for a response based wide area protection and control (WAPaC) scheme against rotor angle instability. This approach based on the trajectories of synchronously measured post-disturbance bus voltage magnitudes differs from previously published methods and results in reliable predictions.

Preferably the trajectory of the voltage magnitude for each of the generator buses is estimated in synchronicity with one another for a prescribed number of cycles responsive to a detected fault condition.

Preferably the similarity value for each trajectory is calculated by calculating a correlation measure or a distance measure over an entire length of each template.

The database of templates may be generated by recording bus voltage magnitude variation patterns following a plurality of simulated disturbances.

The recorded patterns may be grouped using a clustering algorithm such that each template represents a group of simulated disturbances.

The generated database of templates may be used to train a classifier algorithm and using the classifier algorithm to determine the rotor angle stability condition.

The method may include identifying a set of templates corresponding to stable and unstable situations for each generator bus.

Alternatively, a common set of templates may be identified which correspond to stable and unstable situations associated with all of the generator buses.

The method preferably includes applying a corrective action to the power system in direct response to determination of the stability condition being unstable.

When the power system comprising a plurality of generator buses, a phasor measurement unit associated with each generator bus so as to measure voltage magnitude of the generator bus in real time, and a phasor data concentrator arranged to receive the measured voltage magnitudes and archive the measured voltage magnitudes in synchronicity with one another in an archive database, the method preferably includes estimating the trajectory of the voltage magnitude for each of the generator buses by receiving the measured voltage magnitudes from the phasor data concentrator.

According to a second aspect of the present invention there is provided a monitoring system for monitoring a rotor angle stability condition in a power system comprising a plurality of generator buses, a phasor measurement unit associated with each generator bus so as to measure voltage magnitude of the generator bus in real time, and a phasor data concentrator arranged to receive the measured voltage magnitudes and archive the measured voltage magnitudes in synchronicity with one another in an archive database, the monitoring system comprising:

a stability monitor in communication with the phasor data concentrator so as to be arranged to receive the measured voltage magnitudes and estimate a trajectory of the voltage magnitude for each of the generator buses; and a template database comprising stable templates and unstable templates in which the stable templates represent typical bus voltage magnitude variation patterns following a disturbance resulting in stable situations and the unstable templates represent typical bus voltage magnitude variation patterns following a disturbance resulting in unstable situations;

the stability monitor being further arranged to calculate a similarity value for each trajectory representing a similarity of the trajectory to the respective templates and evaluate a combination of the calculated similarity values for a plurality of the generator buses to determine that the rotor angle stability condition of the power system is stable if the trajectories of the generator buses are similar to stable templates and to determine that the rotor angle stability condition of the power system is unstable if the trajectories of the generator buses are similar to unstable templates.

Preferably the stability monitor is arranged to estimate the trajectory of the voltage magnitude for each of the generator buses for a prescribed number of cycles responsive to detection of a fault condition, and more particularly responsive to detection of a clearance of a fault condition.

The stability monitor may be arranged to calculate the similarity value for each trajectory by calculating a correlation measure or a distance measure over an entire length of each template.

Each template in the template database is preferably representative of a group of related simulated disturbances.

The system may comprise a classifier arranged to classify the similarity values according to unstable or unstable conditions to determine the rotor angle stability condition.

The template database may include a set of templates corresponding to stable and unstable situations in association with each generator bus respectively, or alternatively a common set of templates corresponding to stable and unstable situations in association with all of the generator buses.

When the system is provided in combination with a power system comprising a power system controller, the stability monitor is preferably in communication with the power system controller so as to be arranged to apply a corrective action to the power system in response to determination of the stability condition being unstable.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1A:
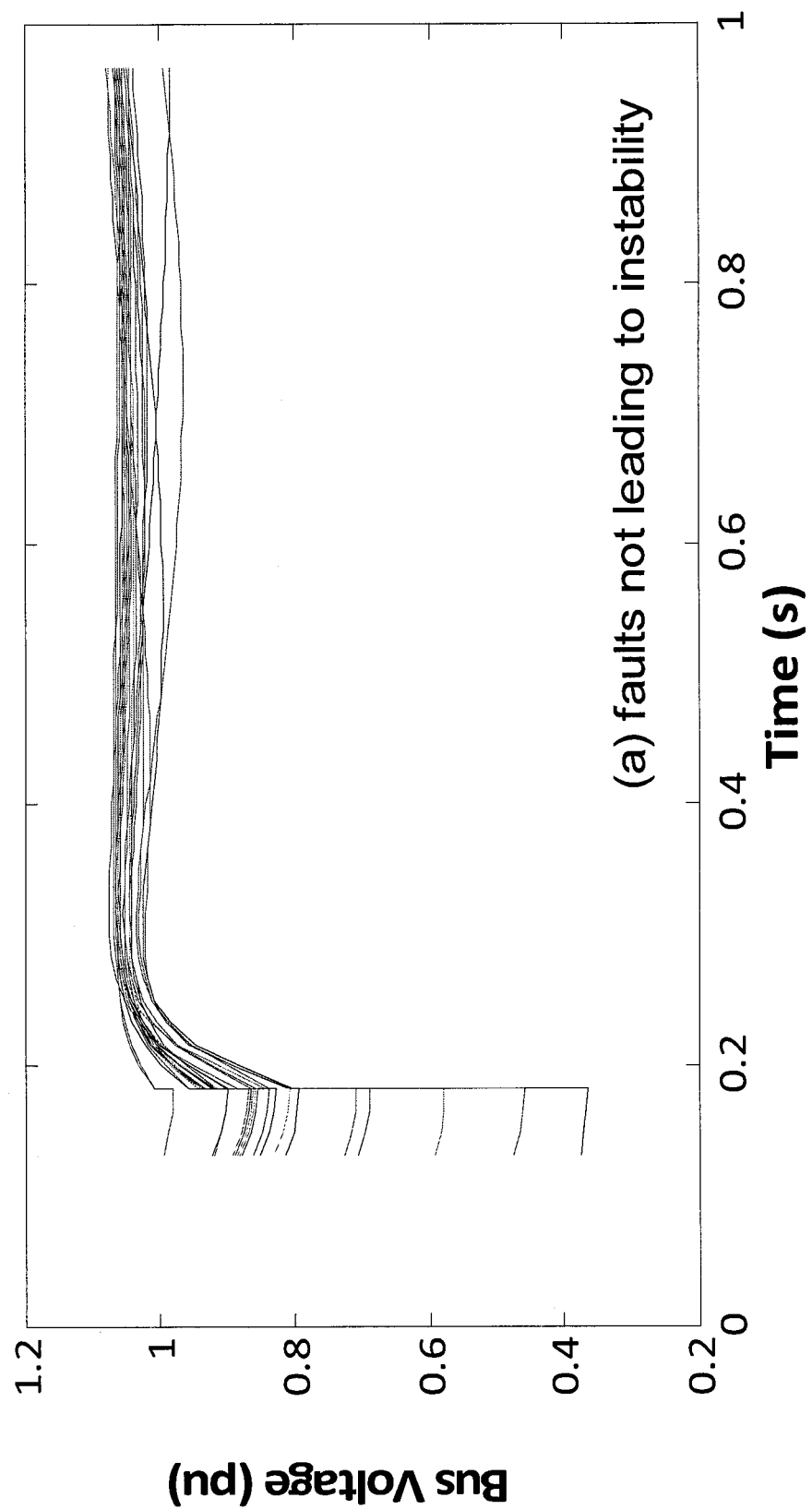
FIG. 1A is graphical representation showing curves corresponding to faults which when cleared resulted in a stable system.

Referring to the accompanying figures there is illustrated a monitoring system for monitoring a rotor angle stability condition of a power system 10. The system 10 is represented schematically in FIG. 16 as a plurality of generator buses 12.

A monitoring system of the power system comprises a plurality of Phasor Measurement Units, known as PMUs, in which each PMU 14 is associated with a respective one of the generator buses. Each PMU 14 provides a real time measurement of voltage magnitude of the respective generator bus as it varies over time. The time is associated with the voltage magnitude to permit synchronization of the measurements of the plurality of generator buses 12.

The power system is further provided with a communication network 16 which provides high speed communication between all of the PMUs 14 and a Phasor Data Concentrator known as a PDC 18. The communication network provides instant real time reporting of voltage magnitudes from the generator buses to the PDC. The PDC 18 in turn receives all of the data from the PMUs 14 and synchronizes the data using the time tagging of the data from the PMUs. The signals from the PMUs are stored on a continuous basis in a suitable archive database 20 in communication with the PDC 18.

A plurality of monitoring and control applications 22 are provided in communication with the PDC 18 in which one of the applications comprises a monitoring system according to the present invention. The monitoring system and its method of predicting rotor angle stability conditions are summarized in FIG. 17.

The monitoring system includes a trigger 24 in the form of an algorithm in communication with the PDC for detecting the occurrence of a disturbance or fault in the power system or the subsequent clearance of the fault. When a detected fault has cleared, the trigger 24 initiates the rotor angle stability prediction algorithm of a stability monitor portion 25 of the monitoring system. Once triggered, the stability monitor tracks the voltage magnitude patterns for each of the generator buses and stores these patterns as trajectories in a suitable memory location. Each trajectory represents variation of the voltage magnitude over a prescribed number of cycles after detection of the fault or the clearance of the fault.

The stability monitor of the system 22 is in communication with a template database 26 which stores a plurality of stable templates and unstable templates therein. Each of the stable templates represents a typical bus voltage magnitude variation pattern following a disturbance which results in a stable situation. Likewise the unstable templates each represent a typical bus voltage magnitude variation pattern following a disturbance resulting in an unstable situation.

In some instances a set of templates corresponding to stable and unstable situations is associated with each generator bus. However, in alternative embodiments a common set of templates corresponding to stable and unstable situations associated with all the generator buses may be stored as described in further detail below.

The templates are generated by simulating various disturbances resulting in stable and unstable situations, and recording the voltage magnitude variation patterns resulting from each of the simulated disturbances. A training algorithm makes use of these patterns and groups these voltage variation patterns using a suitable clustering algorithm such that each template represents a group of respective stable or unstable simulated disturbances, also as described in further detail below.

Once the stability monitor of the monitoring system 22 communicates with the template database 26 to retrieve the respective templates, the stability monitor 25 calculates a similarity value for each trajectory representing a similarity of the trajectory to the respective templates. The similarity value for each trajectory is calculated by a correlation measure or a distance measure of the trajectory from the template over and entire length of the prescribed number of cycles of each template as described in further detail below.

The stability monitor of the monitoring system 22 further comprises a classifier 28 which classifies the trajectories by evaluating a combination of the calculated similarity values for a plurality of the generator buses. If all of the trajectories are more similar to stable situations, then the resulting rotor angle stability condition is determined to be stable. In this instance no further action is required and the trigger resumes its function of detecting fault occurrences prior to initiating estimation of a new set of trajectories of voltage magnitude variation patterns for the generator buses.

If one or more trajectories are indicative of an unstable situation, the overall system may be considered unstable such that further action is required to correct the unstable situation.

The stability monitor typically includes an emergency control algorithm 29 in communication with suitable alarms 30 to alert operators of the instability. Furthermore the stability monitor communicates with a controller 32 of the power system such that the stability monitor is arranged to apply a corrective action to the power system in response to determination of the stability condition being unstable. The type of corrective action to be taken is determined by consulting with the stability monitor to identify the type of instability and the generator bus with which the unstable fault is associated with. The corrective actions can be automatically employed in direct response to determination of the stability condition resulting from the real time recordation of the voltage magnitude variation patterns so that corrective action can be taken before the system becomes unstable.

The proposed rotor angle stability prediction method can be used to detect any imminent instability conditions, activate alarms and automatically trigger suitable emergency control actions to prevent or minimize the impacts on the power system. The method requires wide area measurement infrastructure consisting of Phasor Measurement Units (PMUs), fast and reliable communications network, and Phasor Data Concentrator (PDC) which receives, time-tag synchronize, integrates, and stores phasor signals from remote PMUs in a virtually continuous basis. As described above, a schematic of such wide are measurement system is shown in FIG. 16.

Figure 16:
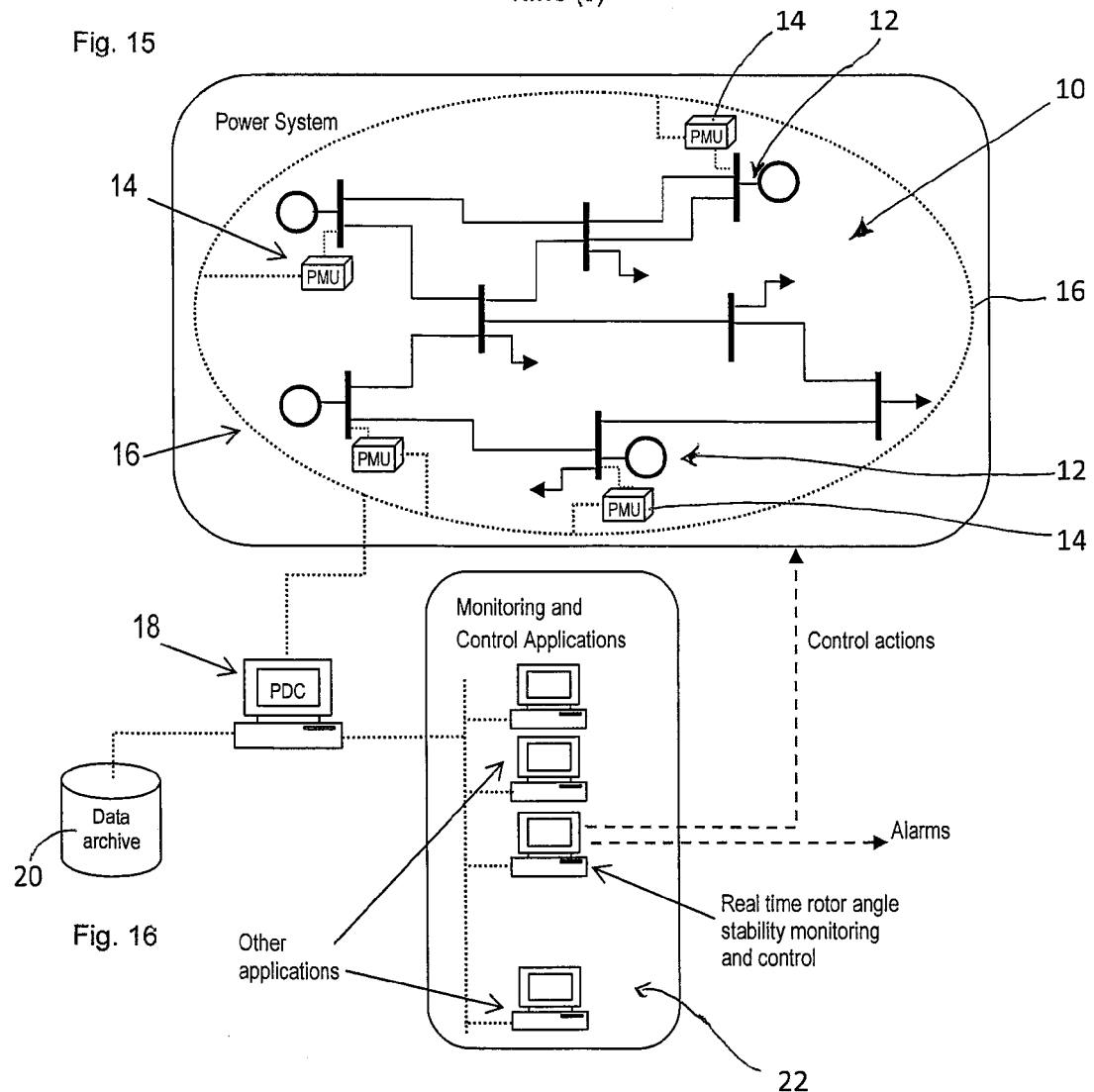
FIG. 16 is a schematic representation of a wide area monitoring, protection and control infrastructure for a power system.
Figure 17:
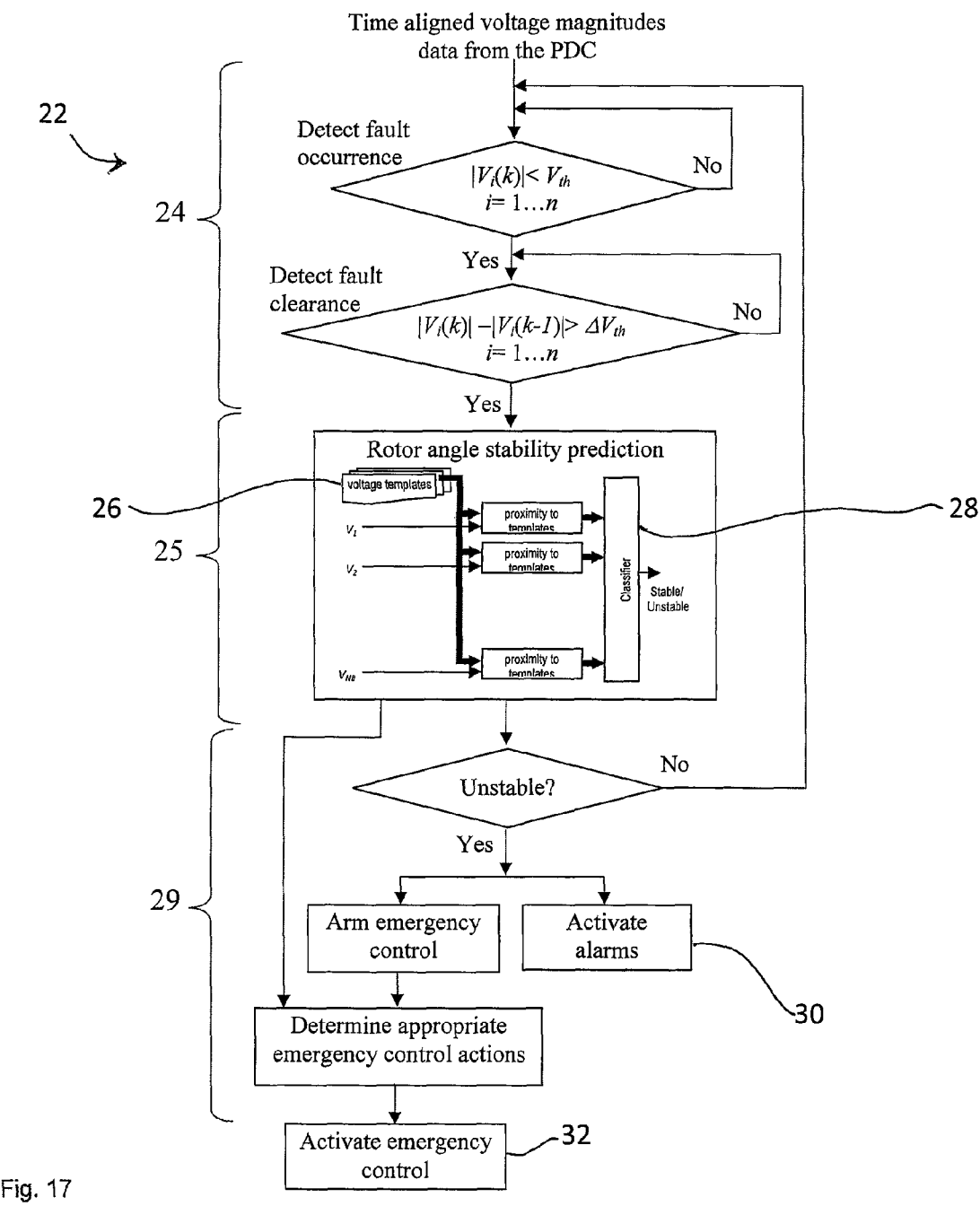
FIG. 17 is a flow chart representing the method for monitoring a stability condition in a power system using the rotor angle stability prediction algorithm described herein.

The proposed rotor angle stability prediction method can be one application among many other wide area monitoring, protection and control applications as shown in FIG. 16. The time-tag synchronized data for the stability prediction is obtained from the PDC (in complex power systems there could be several levels of PDCs; substation PDC, area PDC and enterprise (super) PDC). The proposed rotor angle stability prediction should be triggered upon clearing of the fault. This could be detected from the voltage dips in the monitored voltages due to the fault as indicated in FIG. 17. The faults occurrence and clearance can also be detected from the circuit breaker status signals and/or protection relay signals, but such a system could involve complex logic.

If an unstable condition is predicted, the alarms are activated and the emergency controls are armed. Based on the monitored variables, suitable emergency control actions can be determined and applied. The emergency control actions, which include generator tripping, load shedding, dynamic breaking, HVDC control, etc. are highly system dependent and should usually be specifically designed for the particular power system at hand.

Rotor angle instability prediction involves progressive monitoring of the power system variables seen after a disturbance and using any changes to determine whether the transient swings are finally stable or not. This differs from dynamic security assessment which usually focuses on determining a stability margin such as the critical clearing time (CCT) of the power system in response to a particular fault. In contrast to dynamic security assessment, instability prediction primarily involve the post disturbance period [4]. If an instability condition can be detected sufficiently early, preventive actions such as system separation, generation shedding, load shedding, dynamic breaking, generator fast valving, and HVdc terminal control (when available) can be taken [6], [7].

Rotor angles, which are the primary indicators of transient instability, need to be expressed relative to a common reference. This reference cannot be defined based on a single generator, since the loss of reference generator or any instability in the reference generator makes the relative angles meaningless. In order to overcome this difficulty, the concept of system center of inertia (COI) angle defined in (1) is used to derive a reference angle:

$$\delta_{CO} = \frac{\sum_{i=1}^{n} H_i \delta_i}{\sum_{i=1}^{n} H_i} \qquad (1)$$

where $\delta_i$ and $H_i$ are the rotor angle and inertia constant of the $i^{th}$ generator respectively. Since the internal machine rotor angles cannot be directly measured, $\delta_i$ is usually approximated by the phase angle of the respective generator bus voltage. In large systems, it may be necessary to group generators into areas loosely assuming that the generators in the each area are coherent and use an area COI angle to represent each generator cluster [8][9].

Most of the rotor angle instability prediction algorithms use measured rotor angles (or voltage phase angles) as the predictors [4] [7]-[12]. One exception is the $V_{mag}$ algorithm used by the WACS system on the BPA network [7]. According to [7], voltage magnitude based transient protection algorithms are faster and simpler. Use of voltage magnitudes could eliminate the errors and extra pre-processing associated with calculation of an angle reference such as COI angle, which need to be continuously updated using real time measurements.

Concept of Rotor Angle Prediction Scheme
Post-Disturbance Bus Voltage Trajectories Consider FIG. 1 which shows post-fault variations of voltage magnitude at a specific bus in a power system, obtained through dynamic simulations. Each curve in the graphs corresponds to a three-phase fault created at arbitrary location in the network, and the simulations have assumed that the fault is cleared by removing the faulted element after 5 cycles.

Figure 1B:
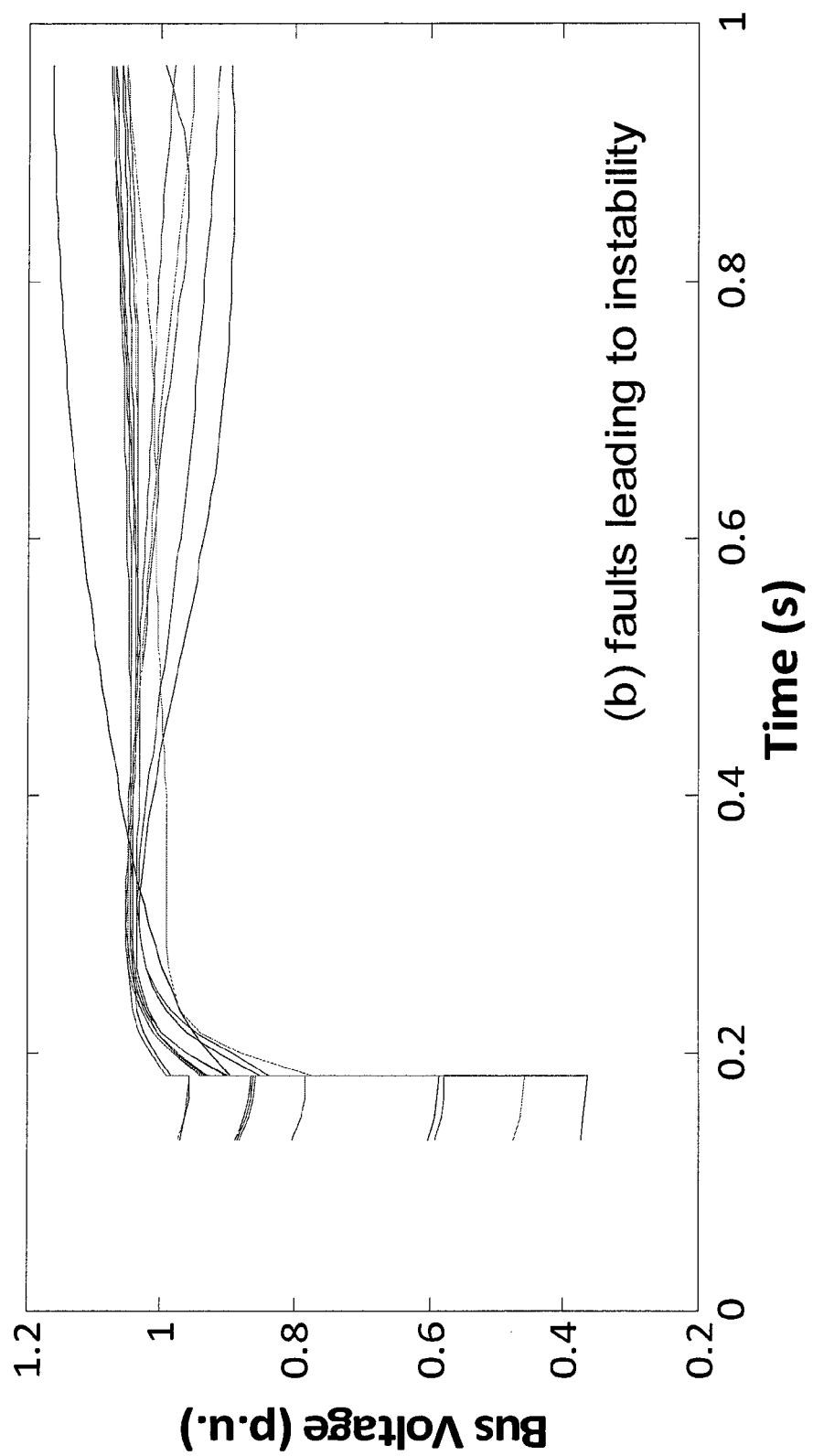
FIG. 1B is a graphical representation showing curves corresponding to faults which when cleared resulted in an unstable system.

FIG. 1A shows the curves corresponding to the faults, which when cleared resulted in a stable system; while the curves shown in FIG. 1B correspond to the faults which resulted in eventual instability of one or more generators. The system was classified as unstable, if one or more generators accelerated or decelerated relative to the others and lost synchronism. In order to compare the post-fault behavior, all curves are aligned at the fault clearing point. There are notable differences between the post-fault voltage magnitude trajectories of stable and unstable faults. When the system is stable, the post-fault voltage tends to remain flat after the recovery. On the other hand, when the fault leads to rotor angle instability, bus voltages usually have a gradually falling or rising trend after the initial recovery; although the trajectory occasionally remains flat. This difference can potentially be exploited to predict the post-fault system stability status.

Bus Voltage Templates

Figure 2:
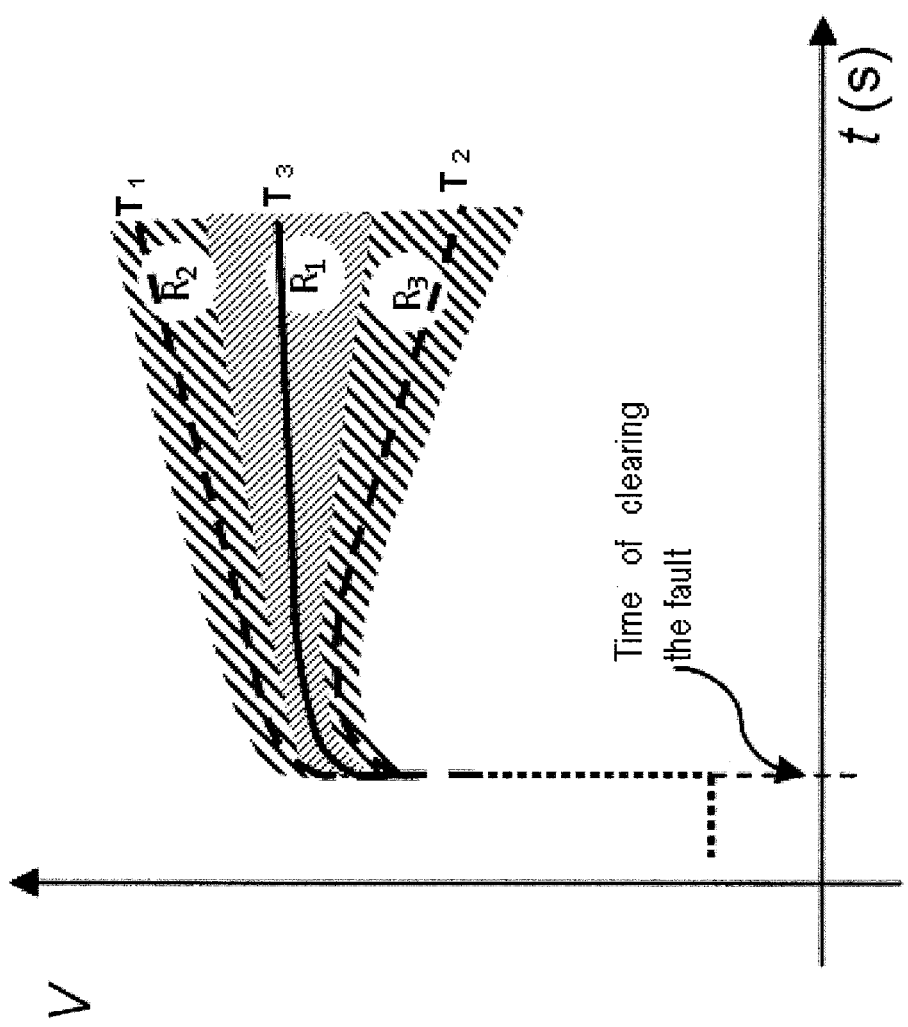
FIG. 2 is a graphical representation of different voltage templates.

Based on the observation of large number of simulation results similar to those shown FIG. 1, it can be concluded that if the post-fault bus voltage trajectories fall within the shaded areas $R_2$ or $R_3$ shown in FIG. 2, there is high probability for the system to be unstable. On the other hand, if the post-fault voltage trajectory is in the region $R_1$, the system is more likely to be stable after the fault.

It is possible to define several representative post-fault voltage trajectories, for example the trajectories $T_1$, $T_2$ and $T_3$ in FIG. 2, to represent different possible voltage variations. Some of these "representative post-fault voltage trajectories", which will be referred to as the "voltage templates" in this paper, are closely associated with the faults that lead to rotor angle instability. For example, voltage templates $T_1$ and $T_2$ in FIG. 2 can be considered as templates closely associated with unstable faults. The voltage template $T_1$ can be assumed representative of the voltage variations after a stable fault.

When a new fault (disturbance) occurs, the bus voltage variations are monitored and the voltage templates that closely match each monitored voltage variation is recognized. Similarity of the evolving voltage trajectory to a voltage template that is closely associated with a fault leading to rotor angle instability will be an indication of an impending unstable situation, and vice-versa. The similarity of the present bus voltage trajectory to a given voltage template can be estimated by calculating a correlation measure or a distance measure over the entire length of the template.

Predicting Rotor Angle Instability

Figure 3:
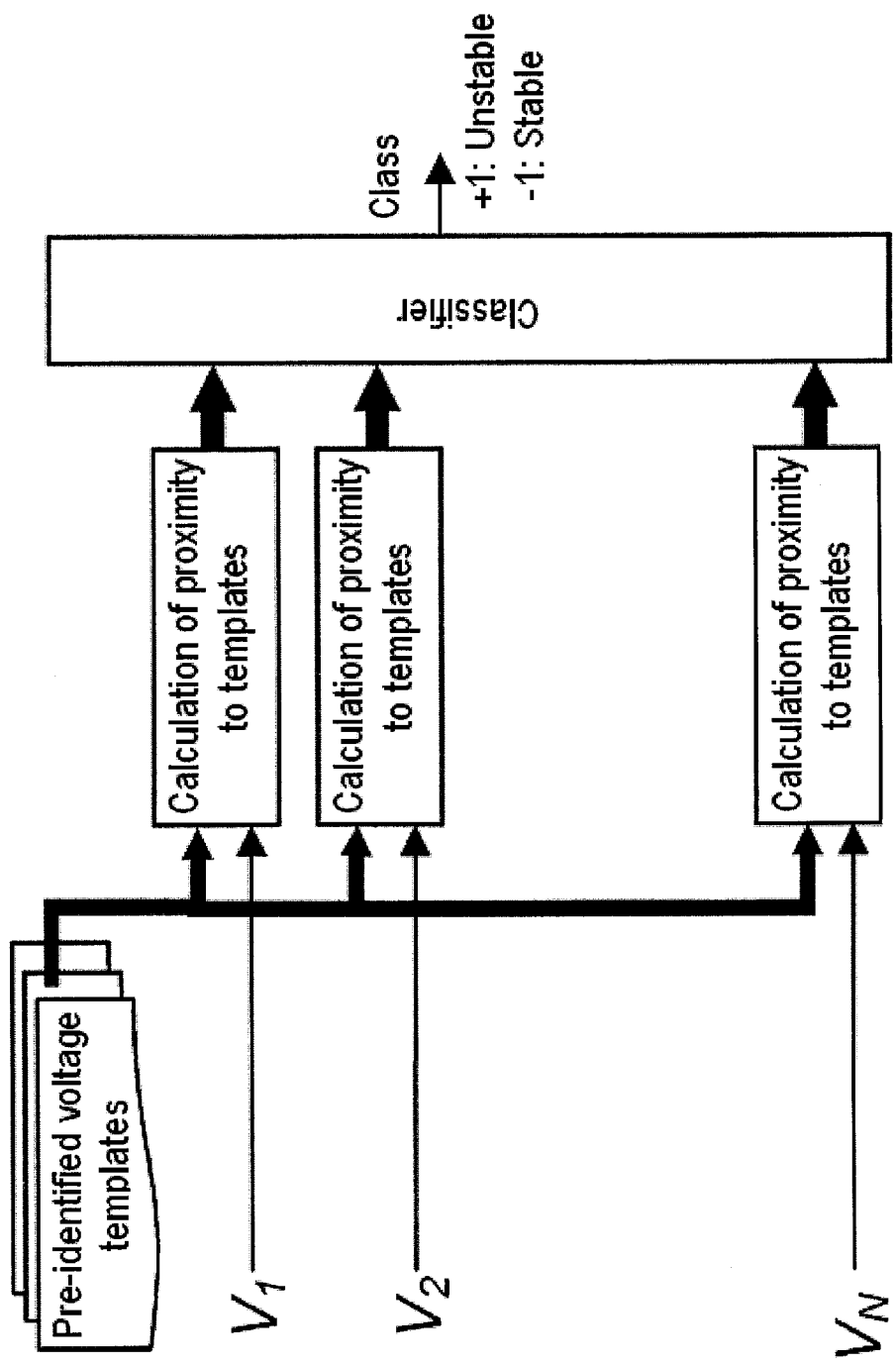
FIG. 3 is a schematic representation of the proposed rotor angle stability prediction scheme.

Although the similarity of the evolving voltage variation to a particular voltage template gives an indication of the possible stability status after the fault, the system stability status cannot be determined reliably by monitoring the voltage at a single bus in the network. For example, there are a number of voltage trajectories in FIG. 1b, which are very similar to the trajectories in FIG. 1a. However, investigations showed that a combination of the similarity values calculated at several important buses in the system can provide a reliable indication of the system stability status after the disturbance. The combination of information from different locations can be achieved by using a classifier which uses the similarity of monitored voltages to pre-defined templates as features. The basic structure of a rotor angle instability prediction system based on the above approach is shown in FIG. 3.

The proposed transient instability prediction system takes the positive sequence voltage magnitudes at key buses in the system as inputs. When a fault is detected, for example by means of the voltage dip resulting from the fault (or alternatively detected through circuit breaker status signal if available in a suitable time frame), the system starts evaluating the similarity of the evolving voltage to pre-identified templates. These similarity values are then fed into a classifier, which predicts the stability status of the power system. Although only the voltage magnitudes are considered in the proposed system, time synchronization of measurements at different buses is important when calculating the similarity to templates. Therefore, the bus voltage measurements should be time synchronized, for example by using phasor measurement units (PMUs). Section IV will describe how the proposed system can be developed in a systematical way.

Procedure for Developing the Rotor Angle Instability Prediction System

The development of the proposed rotor angle instability prediction system is a three-step procedure. These steps are:

1. Generation of database of dynamic simulation cases;
2. Identification of voltage templates associated with each bus; and
3. Training of classifier.

These steps are described in the following subsections.

Generation of Database

A database of simulation cases is required to identify templates and to train the classifier. It is important to consider a variety of credible contingencies, as many as practically possible, in the database. Since most power systems are designed to be n−1 stable under normal conditions, a single contingency should not lead to rotor angle instability. The possible scenarios such as simultaneous multiple contingencies and failure of primary protection (which would cause longer fault clearing times) need to be included in the database. It is also important to consider lightly and heavily loaded conditions. The system simulation models used to generate the database should be as accurate as possible and include all fast acting controls AVR and HVdc or FACTS controllers. Entries of simulation database are the time variations of the bus voltages after each disturbance and a corresponding logical variable which indicates whether the system was stable or not after the particular disturbance.

Identification of Voltage Templates

The process of selecting voltage templates can be viewed as a problem of time series data clustering. The database contains a large number of voltage trajectories corresponding to a particular bus. These voltage trajectories, which correspond with different faults, need to be clustered in to a limited set of templates. There are several approaches for time series clustering [13]. In this paper, the fuzzy C-means (FCM) clustering algorithm was utilized. Fuzzy C-means clustering allows one piece of data to belong to two or more clusters. This method developed by Dunn [14] in 1973 and later improved by Bezdek [15] is based on the minimization of following objective function:

$$J_m = \sum_{i=1}^{N} \sum_{j=1}^{C} \mu_{ij}^m \|x_i - c_j\|^2 \quad (2)$$

where m is any real number greater than 1 representing the degree of fuzziness, $\mu_{ij}$ is the degree of membership of $x_i$ in the cluster j, $x_i$ is the $i^{th}$ of L-dimensional input data, $c_j$ is the L-dimensional centre of the cluster, and $\|*\|$ is any norm expressing the similarity between input data and the cluster centre. N is the number of data sets and C is the number of cluster centers. Fuzzy partitioning is carried out through an iterative optimization of the objective function in (2) with the update of membership $\mu_{ij}$ and the cluster centers $c_j$ by:

$$\mu_{ij} = \frac{1}{\sum_{k=1}^{C} \left( \frac{\|x_i - c_j\|^2}{\|x_i - c_k\|^2} \right)^{1/m-1}} \quad (3)$$

$$c_j = \frac{\sum_{i=1}^{N} \mu_{ij}^m \cdot x_i}{\sum_{j=1}^{C} \mu_{ij}^m} \quad (4)$$

In the application considered in this paper, $x_i = V_i = [V_{i1}, V_{i2}, \ldots V_{ik}, \ldots V_{iL}]$ is a measured voltage trajectory of L data points, $c_j = [c_{j1}, c_{j2}, \ldots c_{jk}, \ldots c_{jL}]$ is a vector representing the voltage template j and the norm $\|*\|$ represents the distance from a voltage trajectory $V_i$ to template $c_j$, which can be expressed by the Euclidean distance $d_{ij}$ calculated as $$d_{ij} = \sqrt{\sum_{k=1}^{L} (V_{ik} - c_{jk})^2} \quad (5)$$

The standard FCM algorithm has the following steps [16]:
1. Choose C ($2<C<N$), m ($1<m<\infty$), and $\epsilon$ (a small number for stopping the iterative procedure). Set the counter p=0 and initialize the matrix of memberships, $U^{(p)}_{(N \times J)}$.
2. Calculate the cluster center, $c_j^{(p)}$ by using (4).
3. Update the membership matrix $U^{(p+1)}$ by using (3) if $V_i \neq c_j^{(p)}$. Otherwise, set $\mu_{ij}^{(p)} = 1$.
4. Compute $\Delta = \|U^{(p+1)} - U^{(p)}\|$. If $\Delta > \epsilon$, increment p and go to Step 2. If $\Delta \leq \epsilon$ stop.

The fuzzy C-means clustering algorithm is a supervised learning process and the number of required cluster centers C (number of templates in the present study) need to be specified. The procedure generally starts by randomly selecting C input data vectors as initial cluster centers.

Here, the above algorithm is modified and a two stage procedure is proposed with the aim of separating templates that are primarily associated with faults leading to instability from the others. The process is illustrated in FIG. 4.

Figure 4:
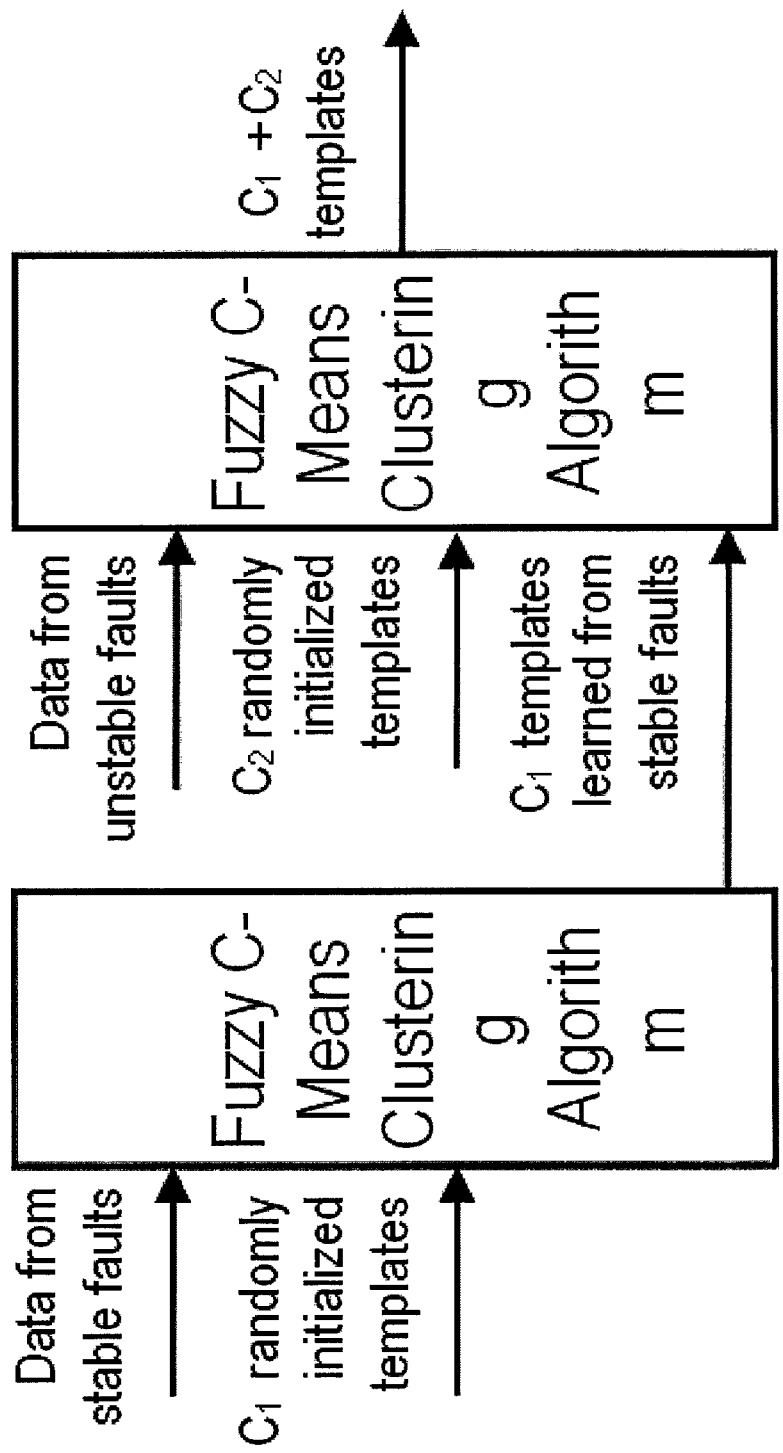
FIG. 4 is a schematic representation of the two stage voltage template identification procedure.

According to the proposed procedure illustrated in FIG. 4, the training database is separated into two parts: Dataset-1 containing only the voltage trajectories recorded for the faults that do not lead to transient instability, and Dataset-2 containing only the voltage trajectories corresponding to faults leading to instability. In the first stage, Dataset-1 is used to identify $C_1$ cluster centers using the standard procedure with randomly initialized cluster centers. In the second stage, $C_1$ cluster centers already identified are included in the initial cluster set together with $C_2$ input data vectors randomly drawn from Dataset-2. During the clustering process, cluster centers identified during the previous stage are not updated in Step-2 of the algorithm. Only the new $C_2$ clusters are updated. However, when calculating the fuzzy memberships in Step-3, all ($C_1+C_2$) cluster centers are considered. At the end of the above process, ($C_1+C_2$) templates are learned from the training database. The first $C_1$ templates are related to the stable faults while the second $C_2$ templates are associated with the faults leading to faults.

Similarity Measure

Figure 5:
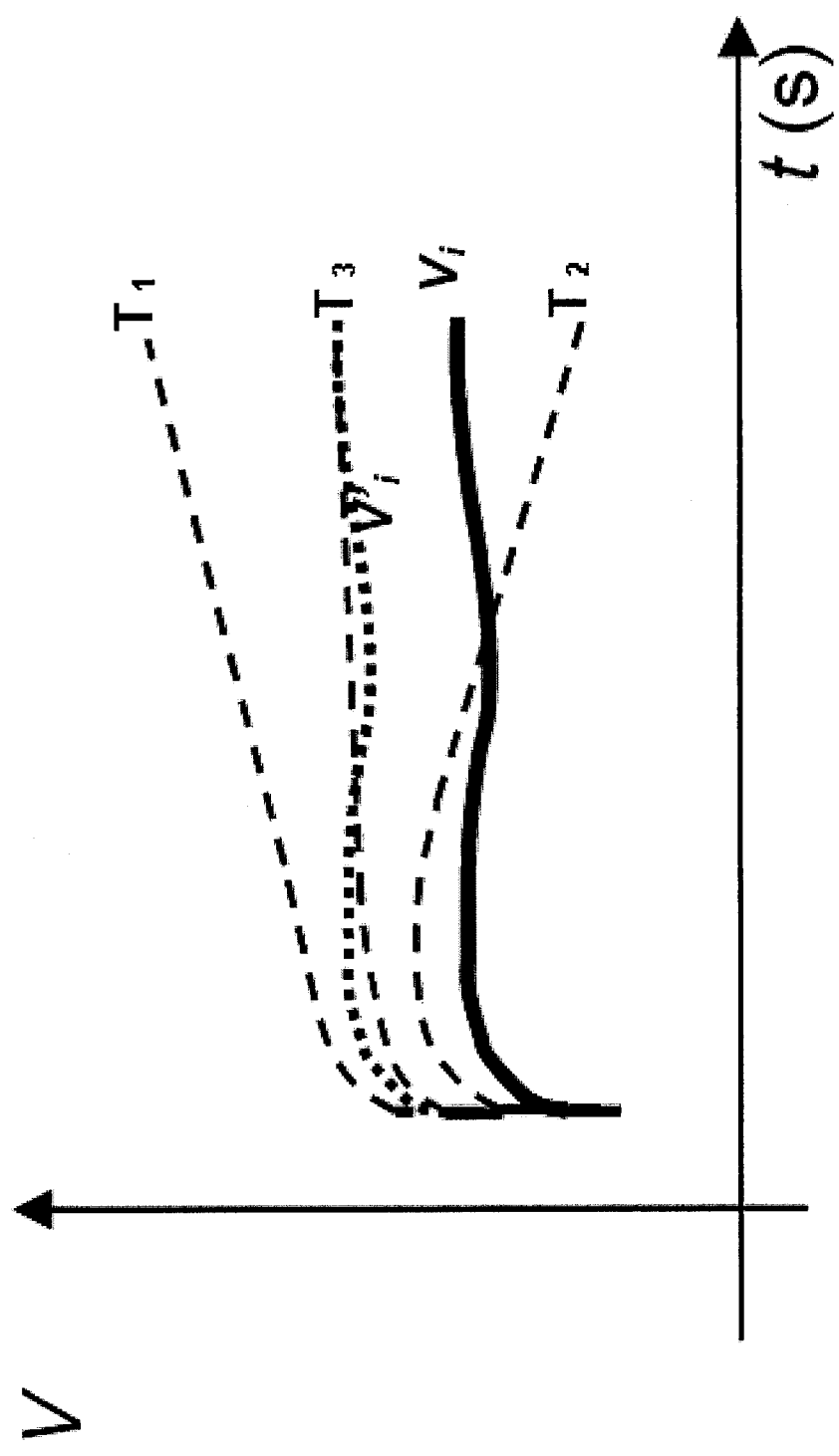
FIG. 5 is a graphical representation of the effect of bias in similarity estimation.

There are a number of suitable indices for quantifying the similarity of actual voltage trajectory to a voltage template. For example the inverse of the Euclidean distance $d_{ij}$ given in (5) can be used as a similarity measure. Alternatively the fuzzy membership of voltage trajectory $V_i$ in the template $c_j$, $\mu_{ij}$ is another proximity measure. Fuzzy membership calculated using (3) is more attractive as an input to a classifier since they are automatically normalized to the range [0-1]. There exist other possibilities such as correlation coefficient but in this paper, fuzzy memberships are considered best suited. However, the way of calculating the norm $\|*\|$ in (3) which express the similarity between input data and the template need to be modified to account for the differences in steady-state voltage levels of the buses as well as the changes in the voltage of the same bus under different loading conditions and network configurations. For example, if the Euclidean distance as calculated by (5) is used, the actual voltage trajectory $V_i$ shown in FIG. 5 will have the highest fuzzy membership in template $T_2$, although it is actually closely following a trajectory very similar to template $T_3$ (see the dotted line $V'_i$ which is obtained by shifting $V_i$ upwards).

In order to remove this bias, calculation of the distance norm is modified $$d_{ij} = \sqrt{\sum_{k=1}^{D} [(V_{ik} - c_{ik}) - (\overline{V}_i - \overline{c}_j)]^2} \quad (6)$$

where $\overline{V}_i$ and $\overline{c}_j$ are the means of vectors $V_i$ containing the samples of the actual voltage trajectory i and $c_j$ containing the samples of voltage template j respectively. This modified norm is then used in (3) to estimate the fuzzy memberships. This modification means that the similarity in terms of the shape of trajectory, rather than its absolute values, is considered. This allows use of one template set for all buses in the system.

Development of Classifier

The goal of the classifier is to predict the future stability status of the system after a fault using the similarity of evolving voltage trajectory to pre-identified voltage templates. The fuzzy membership values can be calculated at all important buses in the system using the templates identified through the procedure described in Section IV-B. Note that if the number of important buses considered is $N_b$, there will be ($C_1+C_2$)× $N_b$ inputs to the classifier.

A number of classification methods based on statistical learning theories can be found in the literature. This study uses Support Vector Machine (SVM) classifiers. SVM classifier training algorithm embodies structural risk minimization and therefore minimizes an upper bound on the expected risk of misclassification. This is in contrast to other neural networks based on empirical risk minimization that minimizes the error on the training data. It is this difference which equips SVM with a greater ability to generalize, and perform better than other classifiers [16].

Given a set of instance-label pairs $(x_i, y_i)$, i=1, ..., N where $x_i=[x_{i1}, x_{i2} ... x_{im}]^T \epsilon R^N$ and $y_i \epsilon \{-1, 1\}^N$, the support vector machine requires the solution of following optimization problem [17]:

$$\min_{w,b,\xi} \frac{1}{2} w^T w + P \sum_{i=1}^{j} \xi_i \quad (7)$$

$$\xi_i > 0$$

Subjected to $$y_i(w^T \cdot \emptyset(x_i) + b) \geq 1 - \xi_i$$

$$\xi_i > 0$$

Here the training vectors $x_i$ are mapped into a higher dimensional space by the function ø. Then the SVM finds a linear separating hyperplane with the maximal margin in this higher dimensional space. P>0 is the penalty parameter of the error term $\xi_i$. Furthermore, $K(x_i, x_j) = \emptyset(x_i)^T \cdot \emptyset(x_j)$ is called the kernel function, and $x_j$, j ∈ SV where SV is a group of support vectors. The kernel used in this paper is the Gaussian function given by $$K(x_i, x_j) = \exp(-\gamma \|x_i - x_j\|^2), \gamma > 0 \quad (8)$$

where γ is a kernel parameter. The standard way to train an SVM is to introduce Lagrange multipliers $\alpha_i$ and optimize them by solving a dual problem. The classifier function for a new input $x_i$ is then given by the sign of $\Sigma_{j \in SV} \alpha_j y_j K(x_i, x_j)$ [19].

Example of Application

Figure 6:
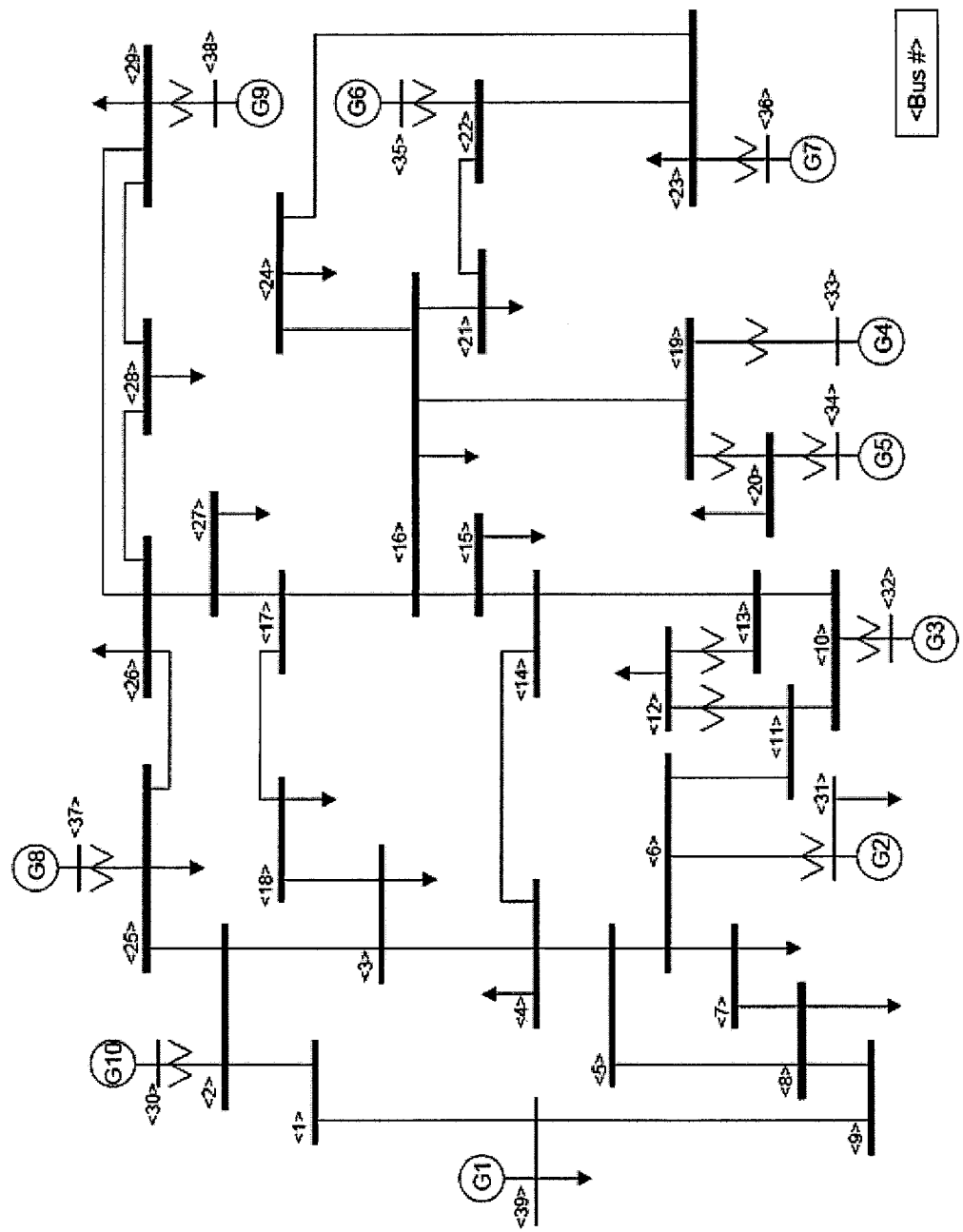
FIG. 6 is a representation of the IEEE-39 bus test power system.

In order to demonstrate the concept, a case study is presented using IEEE 39-bus test system (New England test system) shown in FIG. 6. This system with 10 generators, (one of which is actually an equivalent generator representing a large system) is often used as a test case for rotor angle and small signal stability studies.

Database of Dynamic Simulations

A large number of contingencies were simulated using TSAT dynamic simulation program [19]. The contingencies included three-phase to ground faults on the busbars and three-phase to ground faults on transmission lines at different locations (25%, 50%, and 75% of the length). It was assumed that all faults were cleared after 5 cycles by removing the respective line or the busbar. These faults were repeated at four different load levels (base load, base load plus 5%, 7% and 10%). This gave a database of 176 simulation cases, of which 120 were stable faults and 56 were unstable faults. From this simulation database, 75% of stable cases and 75% of unstable cases were randomly selected to use as raining data. The remaining 25% of the cases were saved for testing.

Voltage Templates

Figure 7:
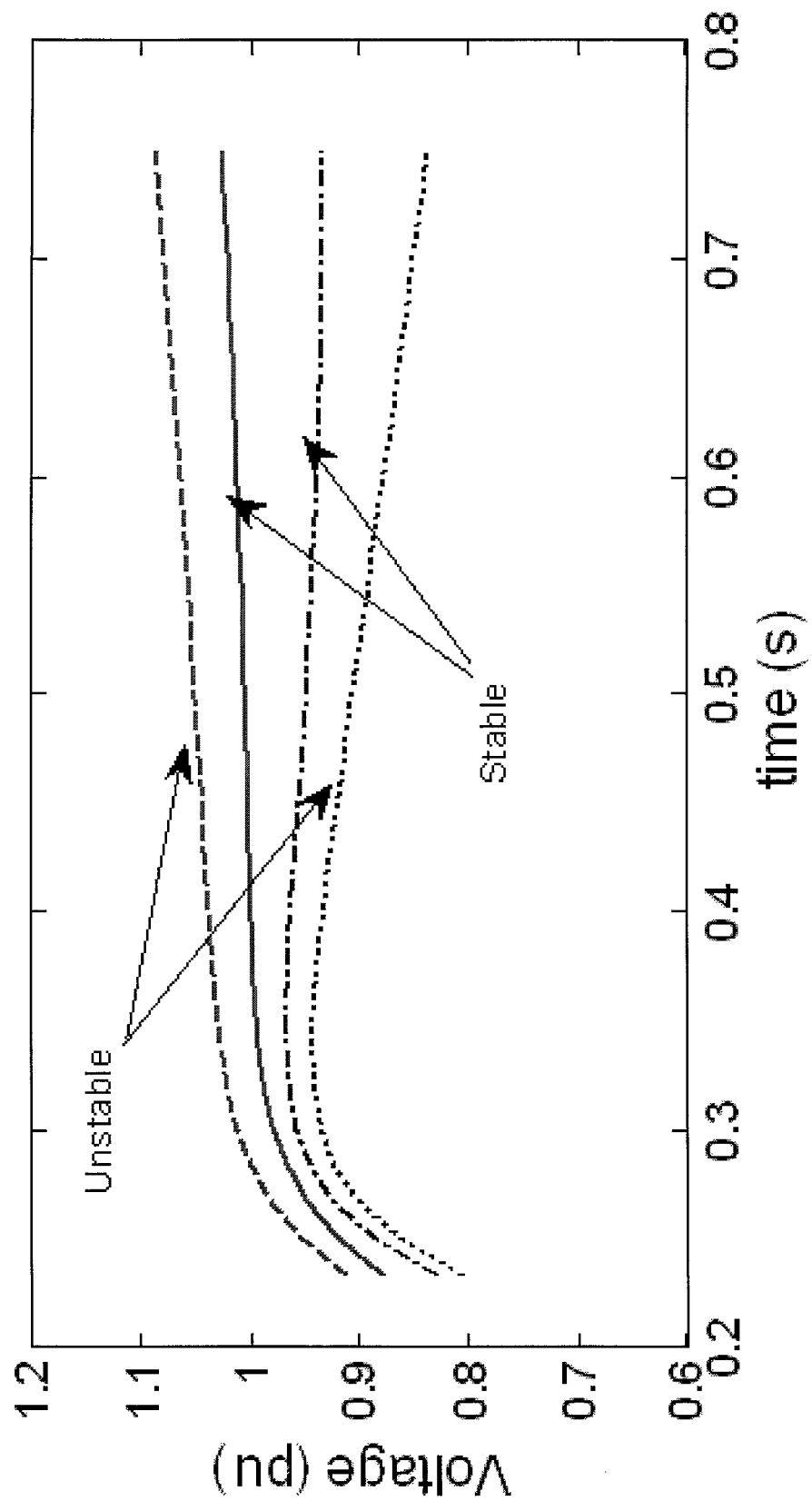
FIG. 7 is a graphical representation of identified stable and unstable templates.

The rotor angle instability is a phenomenon associated with generators. Thus monitoring of generator buses is important in rotor angle instability prediction. Therefore, the voltage magnitudes measured at all nine generator buses (the 10$^{th}$ is the generator representing the equivalent system) were used in the instability prediction system. The proposed two stage fuzzy C-mean clustering algorithm presented in Section IV-B was used with post-disturbance voltages of all generator buses in the training data set to identify four voltage templates. The clustering algorithm was applied with some user intervention to prevent the undue influence of the outlying voltage trajectories. The clustering algorithm tends to assign templates on a priority basis to the outlying trajectories in the database, since those are seen as unique categories. This was avoided by manually removing such occasional outlying trajectories from the database during the process of learning cluster centers. The selected templates are shown in FIG. 7. The templates shown are 31 cycles long and it was assumed that measurements are available at every cycle. Templates marked as stable templates were obtained using only the data for stable faults in the first stage of clustering algorithm and the remaining two templates were identified in the second stage.

Classifier and Prediction Results

Figure 8:
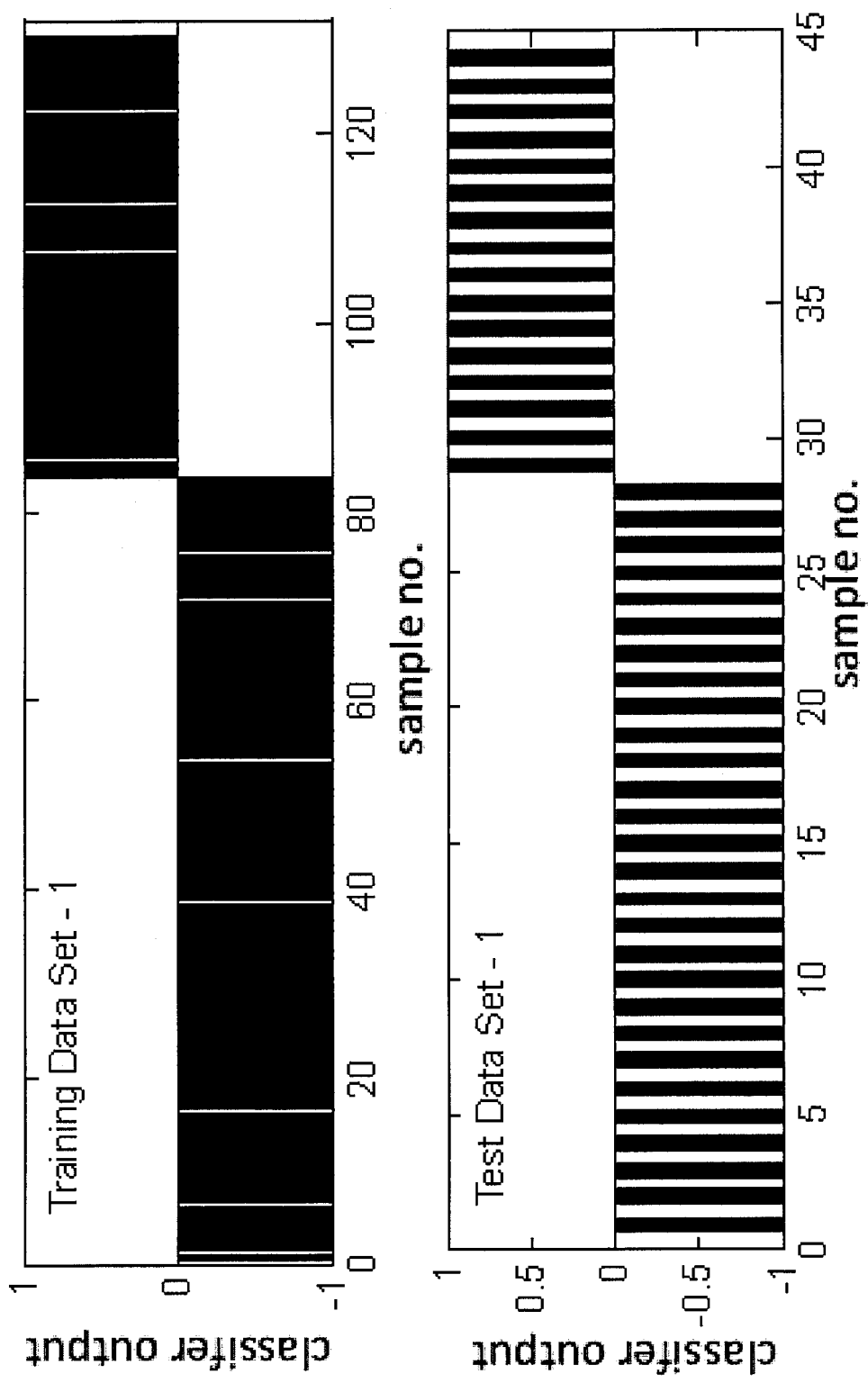
FIG. 8 is a graphical representation of the prediction results for training and test data sets.

After selecting four voltage templates, the same training data was used to train the classifier. With a given input data vector corresponding a particular fault, 36 similarity values (fuzzy memberships) corresponding to nine generator buses and the four templates associated with each bus were calculated using (3) and (6). These 36 similarity values were the inputs to the SVM classifier. The SVM classifier was implemented using LIBSVM [20]. Good values for the parameters P and γ were found through a simple grid search. The values of both P and γ were varied in steps (P: $2^{-2}$ to $2^9$ in steps of $2^i$, and γ: 0.001 to 0.01 in steps of 0.001), and the SVM was trained repeatedly with different P-γ pairs. The values of P-γ pair that minimize the training error were selected from the grid search. Then the classifier is tested with completely unknown test data set. The results are shown in FIG. 8.

The classifier output is equal to +1 when the system is unstable after the fault and it is equal to −1 when the system is stable following the fault. For the training data set, instances 1 to 83 were stable while 84 to 130 were unstable. In the case of test data, samples 1 to 28 were stable cases and 29 to 44 were unstable cases. According to FIG. 8 classifier is 100% accurate in predicting events belonging to both stable and unstable classes.

The Effect of Template Length

In the previous example, the voltage template consisted of voltage data for 31 cycles after clearing the fault. This means that the classifier has to wait about 0.5 s after the fault is cleared to be able to collect the data required for classification. In order to examine what is the minimum length of template that would give satisfactory classification results, the classifier was trained with different template lengths. The results of this investigation are presented in Table I. According to Table I, a template length as short as 6 cycles is sufficient to accurately predict the stability status. The shorter the template length required, the faster the prediction of stability status. When a fault occurs, "instantaneous" local protection clears the fault. The proposed system, which continues to observe the system after clearing the fault, predicts the rotor angle stability status at the end of the observing time (template length). In addition to this mandatory observation time, delays associated with the measurement, communication, processing of the protection algorithm, and the communication of control commands back to actuators need to be included in the response time of the WAPaC system. With the proposed scheme, a one second response time seems to be an achievable target.

TABLE I

PREDICTION ACCURACY WITH DIFFERENT TEMPLATE LENGTHS

| Template Length (cycles) | Prediction Accuracy on Training Data | | | Prediction Accuracy on Test Data | | |
|---|---|---|---|---|---|---|
| | Stable cases | Unstable cases | Overall | Stable cases | Unstable cases | Overall |
| 31 | 83/83 | 47/47 | 100% | 28/28 | 16/16 | 100% |
| 26 | 83/83 | 47/47 | 100% | 28/28 | 16/16 | 100% |
| 21 | 83/83 | 47/47 | 100% | 28/28 | 16/16 | 100% |
| 16 | 83/83 | 47/47 | 100% | 28/28 | 16/16 | 100% |
| 11 | 83/83 | 47/47 | 100% | 28/28 | 16/16 | 100% |
| 6 | 83/83 | 47/47 | 100% | 28/28 | 16/16 | 100% |

Dependency on Training Dataset

In order to test the robustness of the proposed procedure, the training/evaluation process was repeated 10 times by randomly selecting the training data set from the database of simulations. Once a training dataset is selected, the remaining cases in the database were taken as the test dataset for the particular training dataset. The purpose of this exercise is to examine the dependency of classifier efficiency on the data set selected for training. Testing of different template lengths with each of the 10 training datasets resulted in 10 tables similar to Table I, with 100% prediction accuracy for all six template lengths considered. This confirms the robustness of the proposed procedure developing the rotor angle instability prediction system. Despite these results, it is prudent to maintain a sufficient diversity of the fault events when selecting the training data.

Similarity Values and Stability Status

Figure 9:
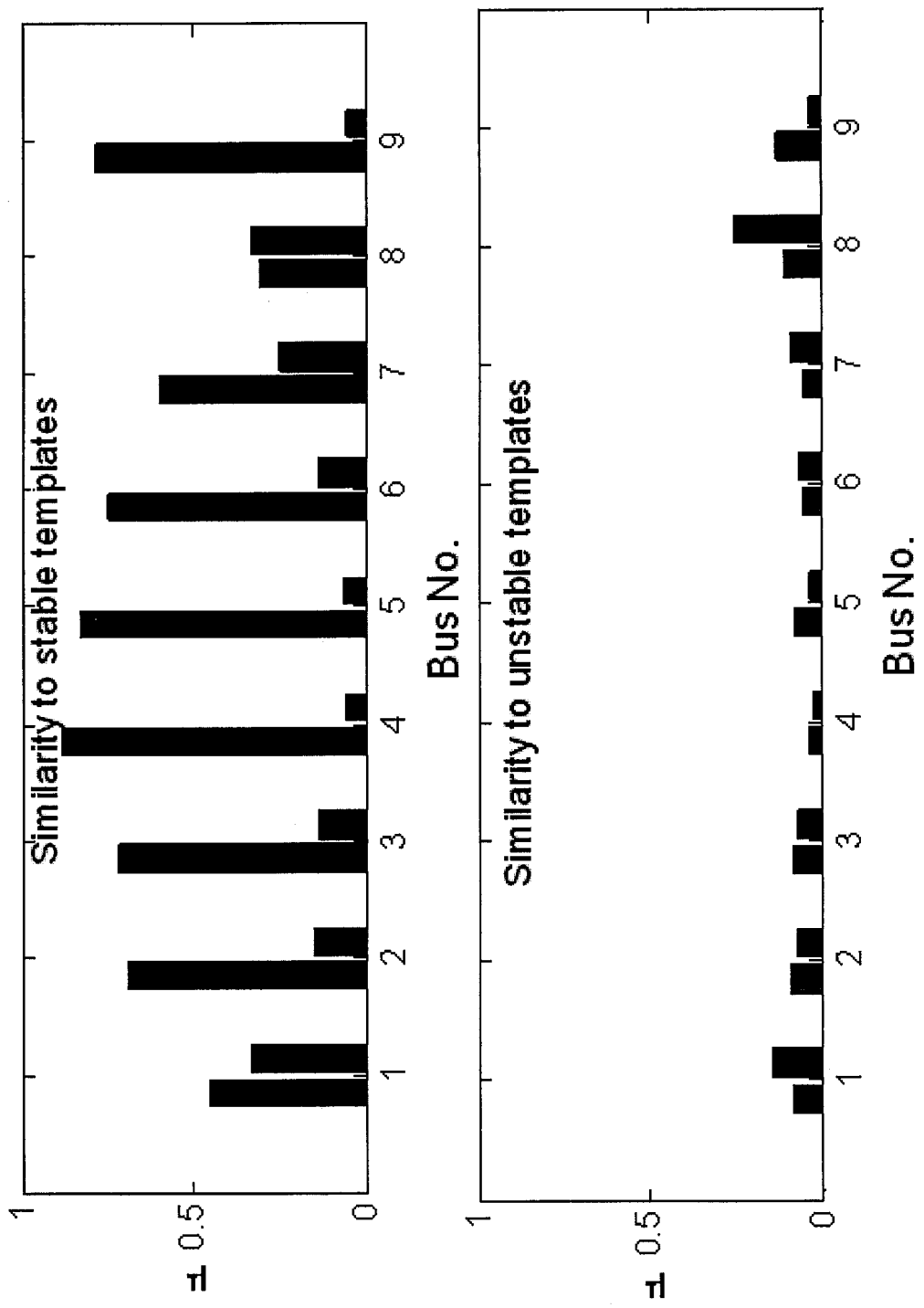
FIG. 9 is a graphical representation of similarity (fuzzy membership) values of generator bus voltages for a stable fault.
Figure 10:
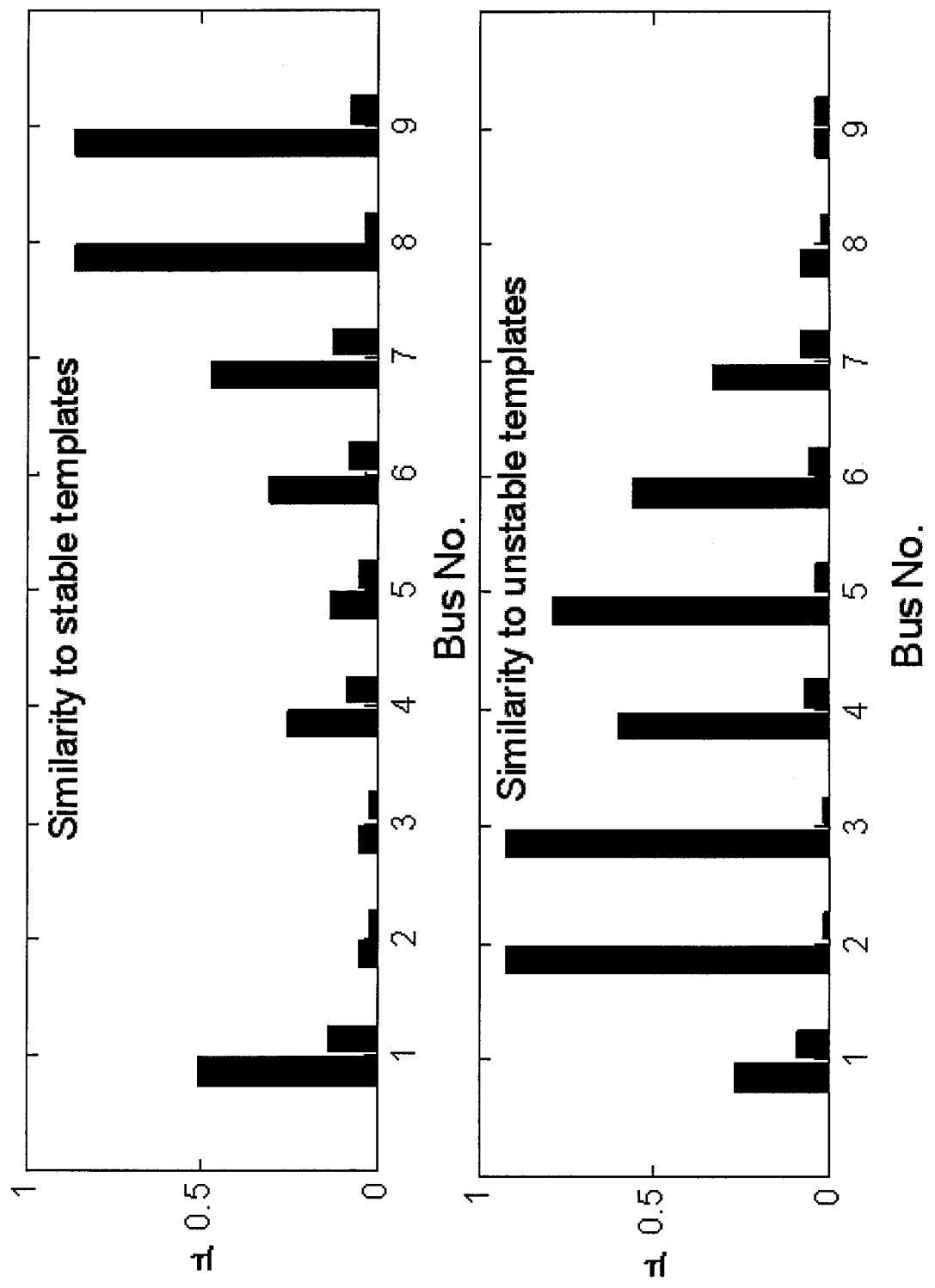
FIG. 10 is a graphical representation of similarity (fuzzy membership) values of generator bus voltages for an unstable fault.
Figure 11:
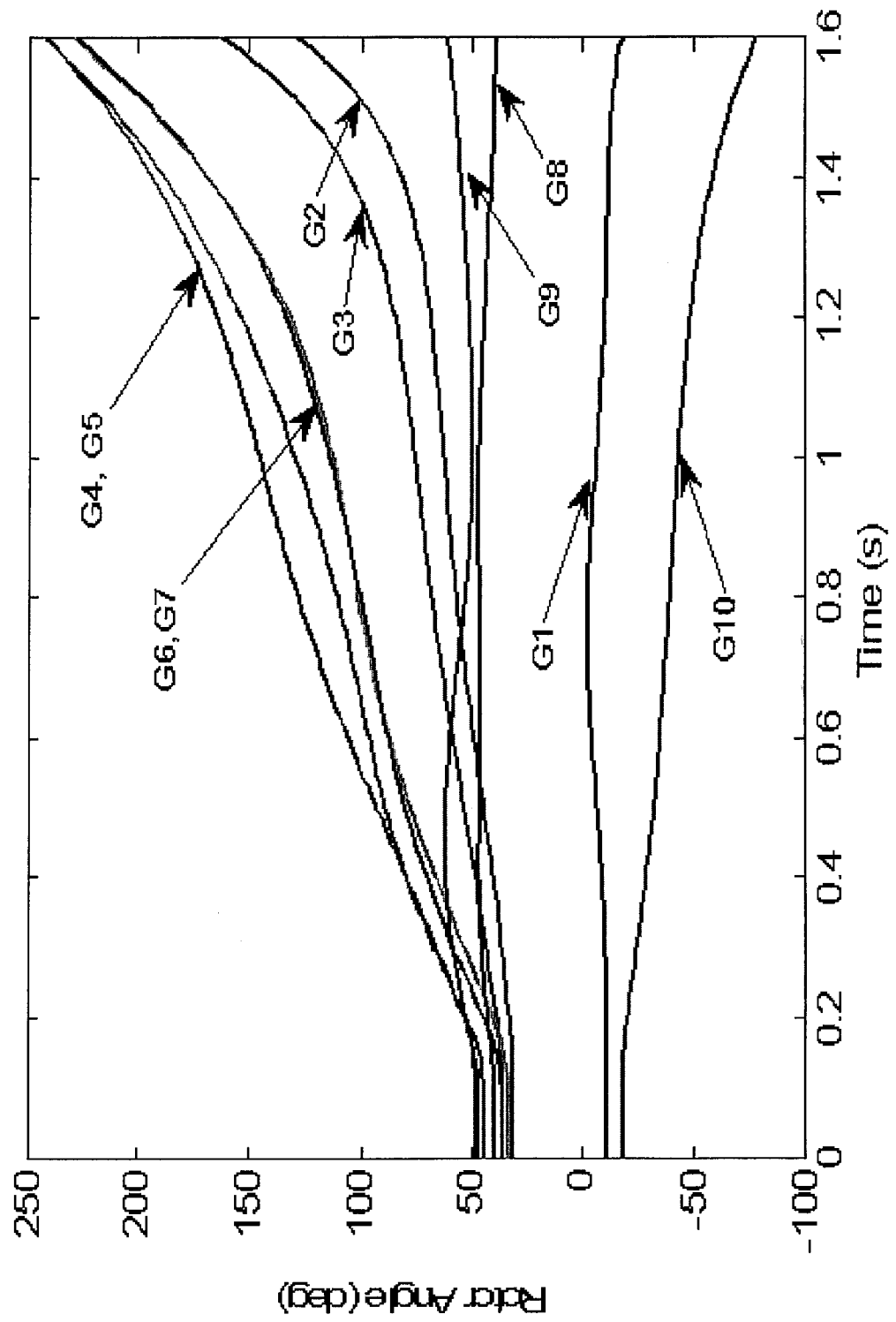
FIG. 11 is a graphical representation of the variation of generator bus phase angles after the unstable fault shown in FIG. 9.

According to the initial assumption based on which the proposed rotor angle instability prediction system was developed, if a generator is unstable, its voltage variations should have a closer similarity to a template associated with instability and vice-versa. The similarity values computed for the nine generator bus voltages for two selected faults, one stable case and one unstable case, are presented in FIG. 9 and FIG. 10 respectively. In FIGS. 9 and 10, the heights of the bars indicate the similarity to a template in terms of the fuzzy membership value of actual voltage trajectory for that template. Memberships of the two stable templates and two unstable templates are plotted separately. The templates used here were 31 cycles long. For the stable fault shown in FIG. 9, membership values of the unstable templates are very low for all generator voltages. However, in the unstable case shown in FIG. 10, some generators have high membership in the unstable templates. FIG. 11 shows the variation of generator rotor angles (more precisely the generator bus voltage phase angles) following the unstable fault shown in FIG. 10. All angles are expressed with reference to COI angle. The generator G10 is the large generator that represents the equivalent system. It can be observed that all bus voltage variations of the accelerating generators, G2-G7, have higher similarity to unstable templates. This type of relationship will be very useful to identify the generators or network areas severely affected by the instability and determine a suitable remedial action. The fuzzy membership values may potentially be used determine the cause and/or remedy for the instability.

Training of the Classifier for a Network with Two HVDC Infeeds

In order to further investigate the applicability of the proposed method, it was applied to predict the stability status of a power system with two HVDC infeeds. The test network was developed by modifying the 39-bus test system used in the previous investigations.

Simulations Results of Symmetrical Faults

Figure 18:
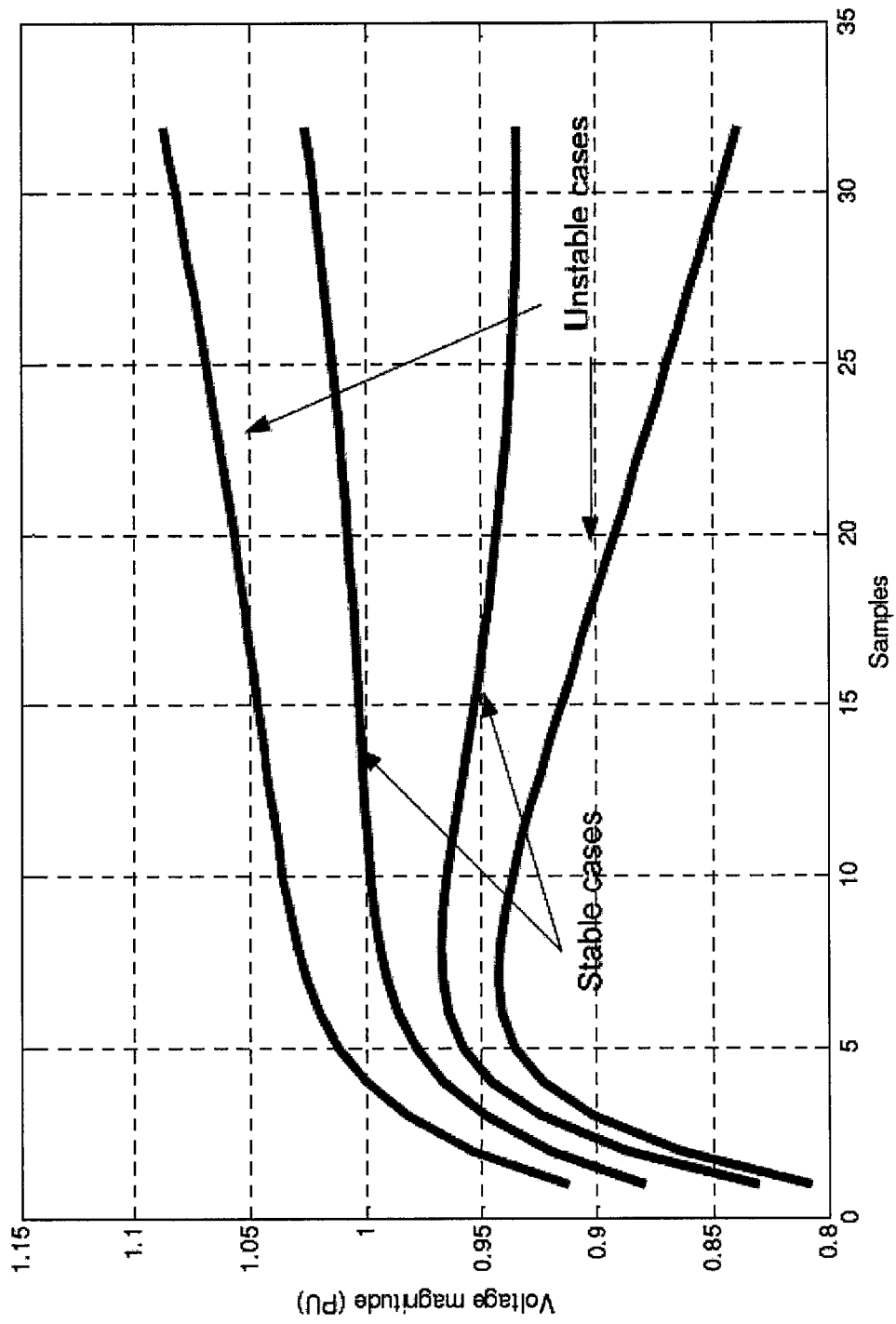
FIG. 18 is a graphical representation of stable and unstable templates generated from test data representing clearance of various faults.

The target output is equal to +1 when the system is unstable following the fault and it is equal to −1 when the system is stable. In the training dataset that contains 100 examples, the instances 1 to 55 are stable while the instances 55 to 100 are unstable. Selection of test data from the database was carried out with some care to maintain sufficient diversity of the fault events. In the following results, 20% of the database is selected as test data and the rest is used as the training data. The test input data set has 25 samples and 1 to 12, are stable cases and 12 to 25 are unstable cases. The template consisted of voltage data for 32 cycles after clearing the fault. This means that the classifier has to wait about 0.5 s after the fault was cleared to collect the data required for classification. FIG. 18 shows the templates generated using the data.

Figure 19:
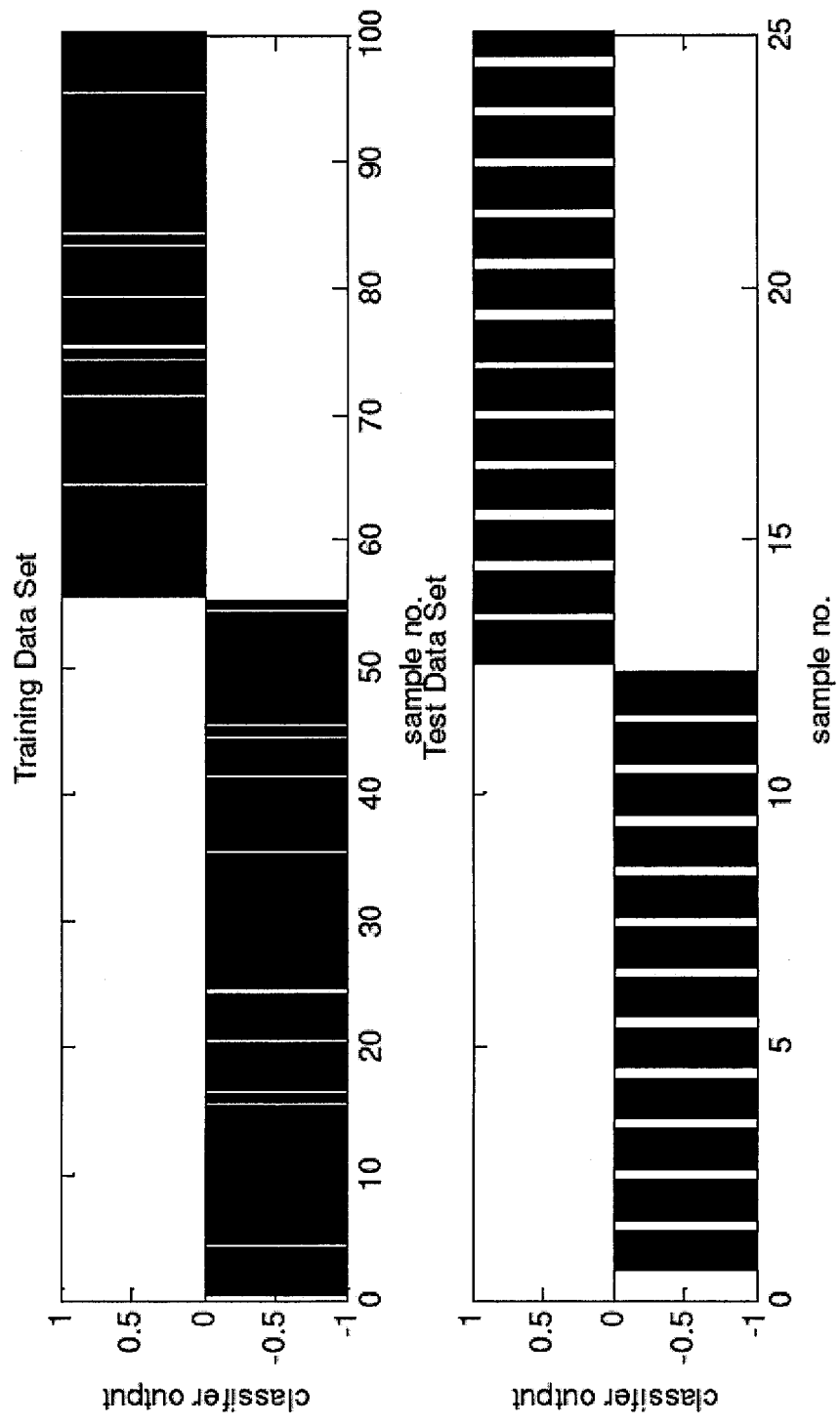
FIG. 19 is a graphical representation of prediction results for training and test data sets.

When the trained classifier is presented with unseen examples contained in test data, 100% accurate classification is observed as shown in FIG. 19. This case study shows that this approach is applicable even to the systems with HVDC infeeds Even though the results shown above are obtained for 32-cycles template length, the classifier is trained with different template lengths to understand the impact of template length. The results of this investigation are presented in Table II. Based on the results, even a template length of 6 cycles is sufficient to accurately predict the stability status. When the template length is shorter, stability status can be predicted faster. If any impending stability condition can be predicted early, there is more time to take preventive action and save the system.

TABLE II

Accuracy with different template lengths

| Template Length (cycles) | Prediction Accuracy on Training Data | | | Prediction Accuracy on Test Data | | |
|---|---|---|---|---|---|---|
| | Stable cases | Unstable cases | Overall | Stable cases | Unstable cases | Overall |
| 31 | 56/56 | 44/44 | 100% | 12/12 | 13/13 | 100% |
| 26 | 56/56 | 44/44 | 100% | 12/12 | 13/13 | 100% |
| 21 | 56/56 | 44/44 | 100% | 12/12 | 13/13 | 100% |
| 16 | 56/56 | 44/44 | 100% | 12/12 | 13/13 | 100% |
| 11 | 56/56 | 44/44 | 100% | 12/12 | 13/13 | 100% |
| 6 | 56/56 | 44/44 | 100% | 12/12 | 13/13 | 100% |

Application of the Method Under Asymmetrical Faults

The original study that proposed the transient stability prediction method and the results presented in the previous study considered only symmetrical three-phase faults. Although three-phase faults are more severe, most common in the power systems are asymmetrical faults. The proposed rotor angle instability prediction method can be easily adapted to handle unbalanced situations by using three units, one for each phase. Each phase unit is input with the generator bus voltages of the respective phase. In order to demonstrate the concept, Phase A unit was implemented. The same voltage template set which was identified using the data for the symmetrical faults was used. Thus, only the classifiers need to be retrained.

Simulation of unbalance faults using stability model has certain limitations, mainly because it outputs only the positive sequence component of the voltages. In certain faults types, the changes in the positive sequence component voltages could be small.

In order to overcome the above limitations, the full three-phase simulations have to be carried out. This is possible with the EMTP-type model implemented in PSCAD/EMTDC. EMTP-type simulation model enables extraction of data related to each phase and all sequence component data which is impossible in the stability model.

Figure 20:
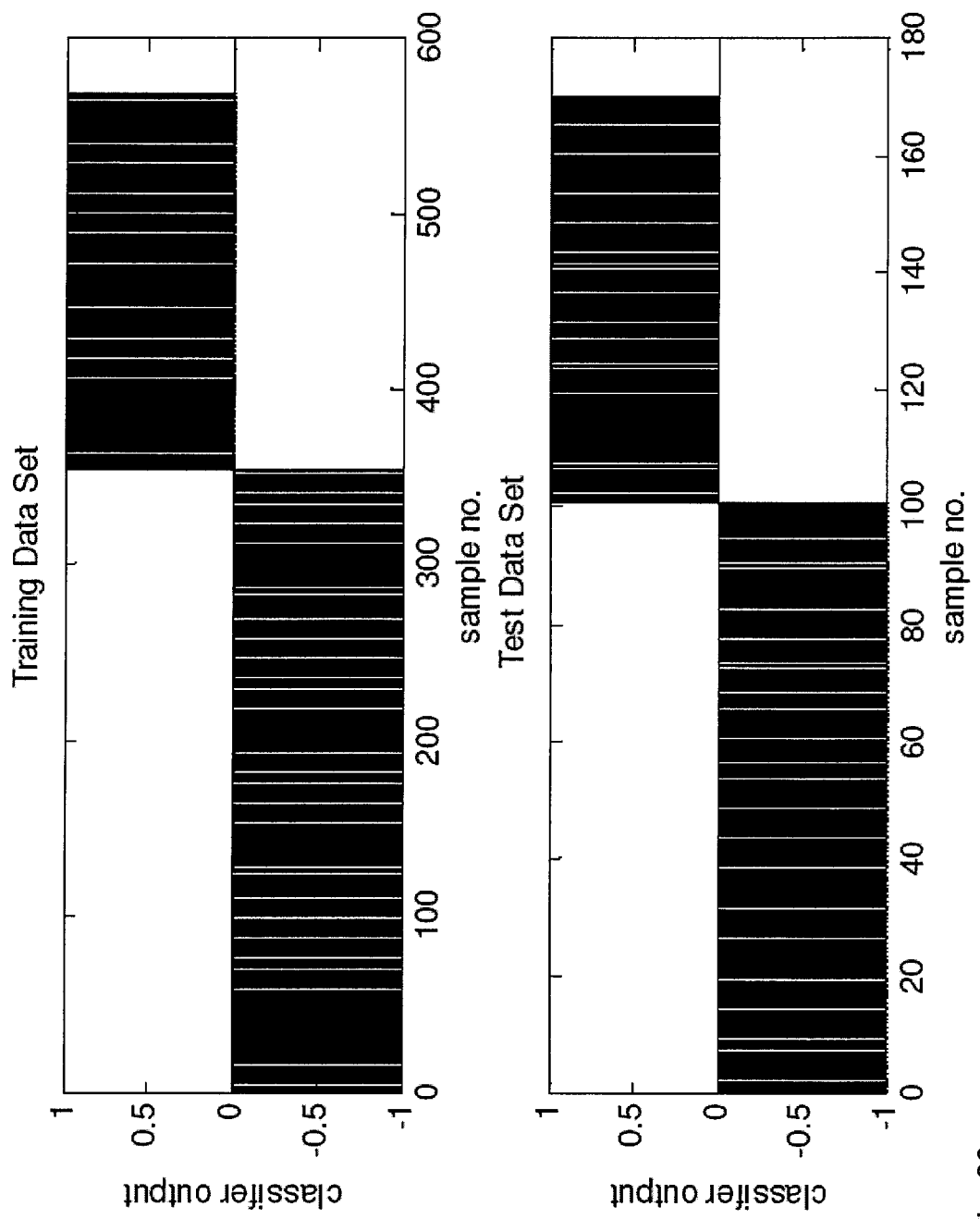
FIG. 20 is a graphical representation of asymmetrical faults prediction results for training and test data sets.

In this investigation, the system without HVDC schemes is used. In order to generate training and testing data, different types of balanced and unbalanced faults are simulated. Single line-to-ground faults on Phase A, line-to-line faults and line-to-line-to-ground fault between Phase A and Phase B are applied on different lines at different locations (25% and 50% distance from the ends). The faults are cleared after 10 cycles duration by tripping off the line. Data of the positive sequence values of phase 'A' are used to train and test the classifier. From the data, 568 cases are used to train to system. Out of the 568 cases, 353 are stable cases. The test data set has 170 cases; case 1 to 100, are stable and the case 100 to 70 are unstable. The same template set which is used in testing symmetrical faults is used to carry out these simulations. The template consisted of voltage data for 32 cycles after clearing the fault. When the trained classifier is presented with unseen examples contained in test data, 100% accurate classification is observed as shown in FIG. 20.

Even though the results shown above are obtained for 32 cycles template length, the classifier is trained with different template lengths to understand the impact of template length. The results of this investigation are presented in Table III. Based on the results, again a template length of 6 cycles is sufficient to accurately predict the stability status.

Table III

Accuracy with different template lengths for asymmetrical faults

| Template Length (cycles) | Prediction Accuracy on Training Data | | | Prediction Accuracy on Test Data | | |
|---|---|---|---|---|---|---|
| | Stable cases | Unstable cases | Overall | Stable cases | Unstable cases | Overall |
| 32 | 353/353 | 203/203 | 100% | 100/100 | 70/70 | 100% |
| 17 | 353/353 | 203/203 | 100% | 100/100 | 70/70 | 100% |
| 6 | 353/353 | 203/203 | 100% | 100/100 | 70/70 | 100% |

Response to Unlearned Situations

In order to further examine the robustness of the proposed rotor angle instability prediction scheme, it was tested under network configurations which are different from the network used for generating the initial training database. Six test cases were generated by changing the pre-fault system status as given in Table IV. All simulations in the training database were carried out with the base case where all lines and generators were in service prior to the disturbance.

TABLE IV

CONTINGENCIES FOR TESTING RESPONSE TO UNLEARNED SITUATIONS

| Case No. | Pre-fault condition | Contingency | Stability status |
|---|---|---|---|
| 1 | Line 21-22 removed | Fault on line 15-16, cleared by removing the line | Unstable |
| 2 | | Fault on bus 24, cleared by removing all connected lines | Unstable |
| 3 | | Fault on line 16-19, cleared by removing the line | Stable |
| 4 | Generator G1 removed | Fault on bus 6, cleared by removing all connected lines | Unstable |
| 5 | | Fault on line 3-4, cleared by removing the line | Stable |
| 6 | | Fault on line 24-16, cleared by removing the line | Stable |

TABLE V

CONTINGENCIES CONSIDERED IN TESTING RESPONSE TO UNLEARNED SITUATIONS

| Case No. | Actual Stability Condition | Predicted Stability Condition with Template Length of # Cycles | | | | | |
|---|---|---|---|---|---|---|---|
| | | 6 | 11 | 16 | 21 | 26 | 31 |
| 1 | 1 | −1 | 1 | 1 | 1 | 1 | 1 |
| 2 | 1 | −1 | 1 | 1 | 1 | 1 | 1 |
| 3 | −1 | −1 | 1 | 1 | 1 | −1 | −1 |
| 4 | 1 | −1 | 1 | 1 | 1 | 1 | 1 |
| 5 | −1 | −1 | −1 | −1 | −1 | −1 | −1 |
| 6 | −1 | −1 | −1 | −1 | −1 | −1 | −1 |

The results of the stability status prediction with templates of different lengths are summarized in Table V. In Table V stability status '+1' indicates an unstable condition and '−1' indicates a stable conditions. It can be seen that predictions with 6 cycle template were inaccurate. The predictions with 11-21 cycle templates were accurate except for Case 3. The results were accurate at longer template lengths.

Figure 12:
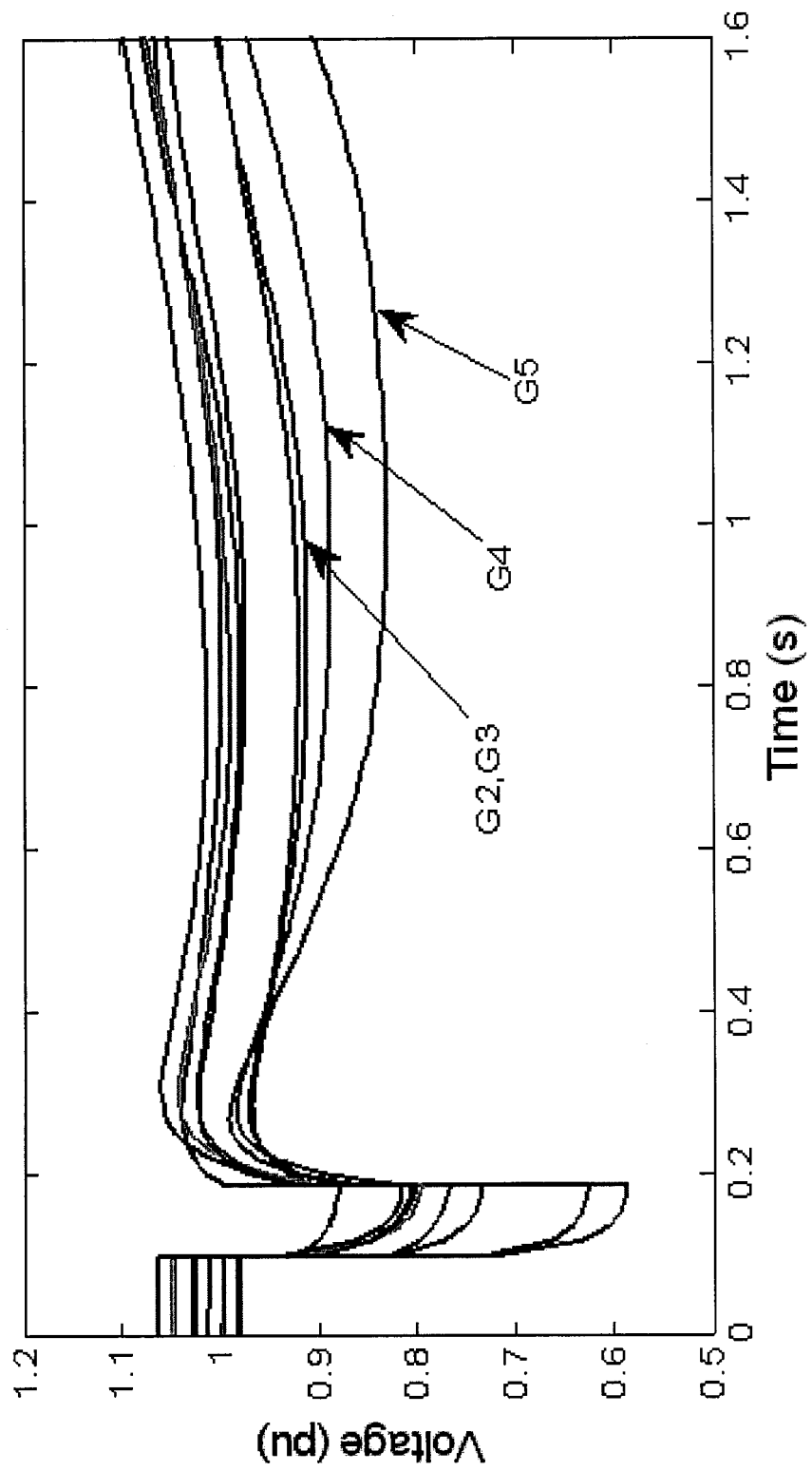
FIG. 12 is a graphical representation of generator voltage variations after the fault in Case 3 of Table III of the detailed description.

Detailed examination of Case 3 reveals that the voltage magnitudes of some generators (G4, G5) dip to about 0.8 pu following the initial recovery (see FIG. 12).

Figure 13:
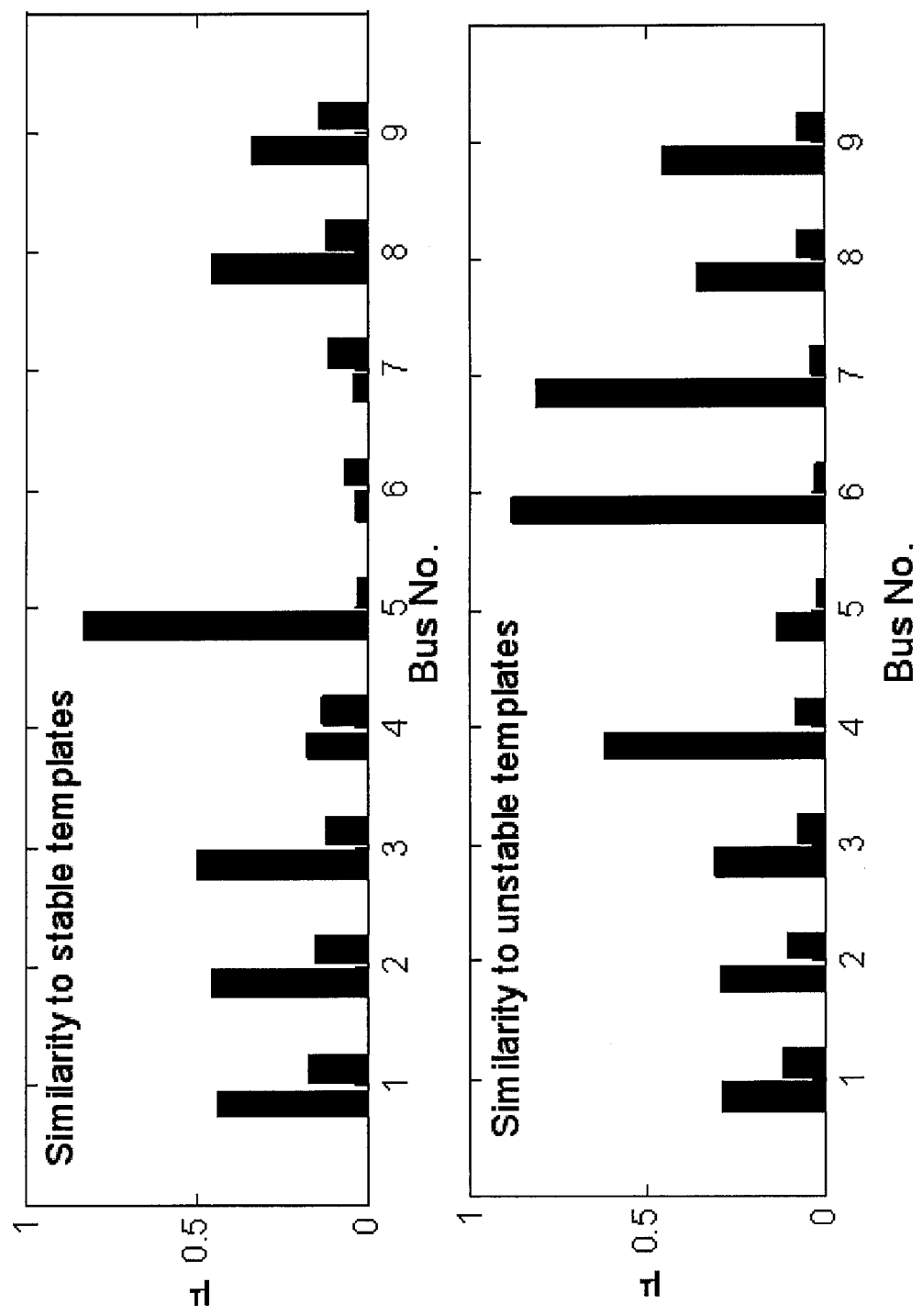
FIG. 13 is a graphical representation of similarity values with a template of 11 cycles.
Figure 14:
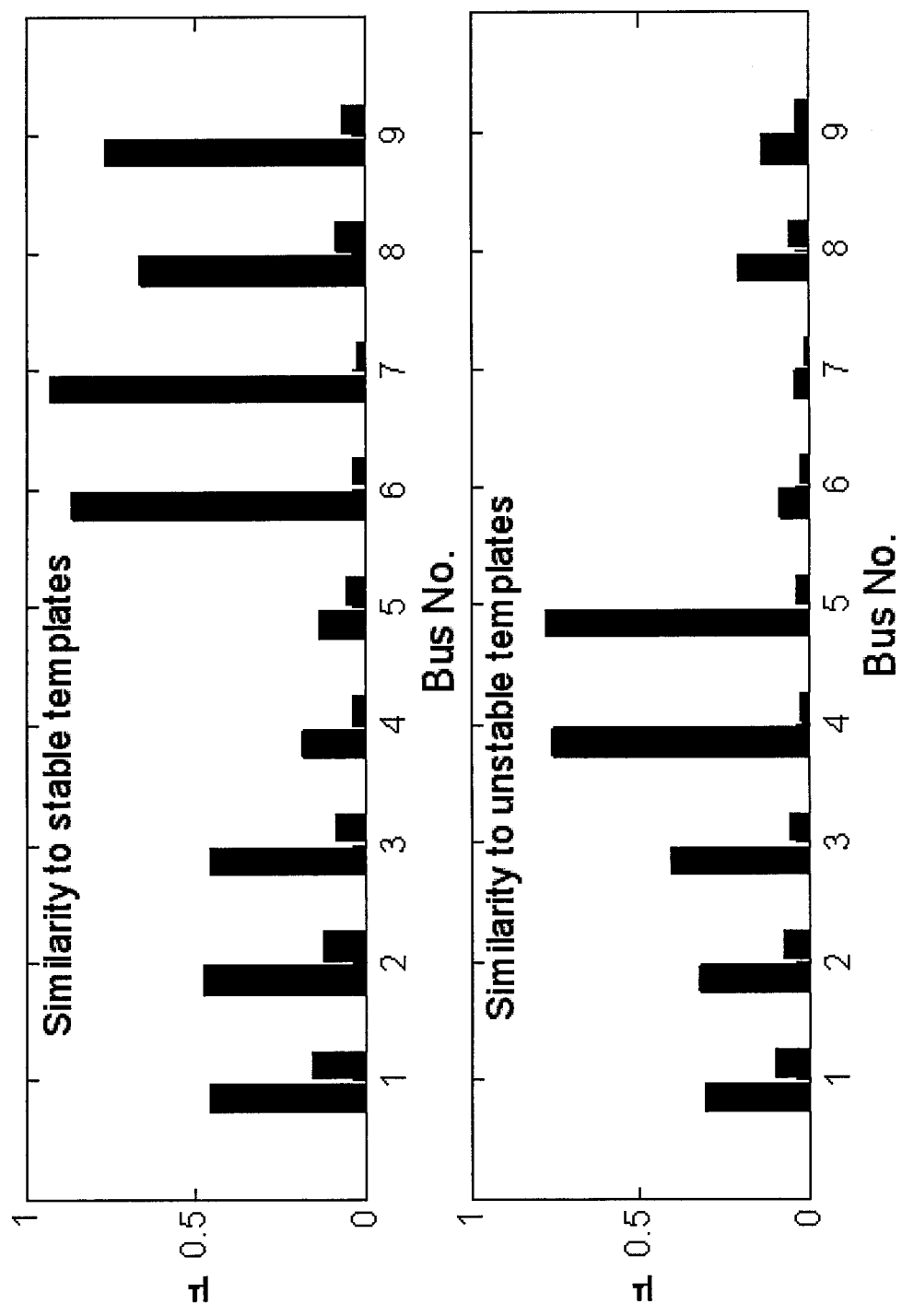
FIG. 14 is a graphical representation of similarity values with a template of 31 cycles.

The similarity values obtained for this case with the templates of 11 cycles and 31 cycles are shown in FIG. 12 and FIG. 13 respectively. With the 11 cycle template, most generator voltages have high membership in the templates associated with instability, and the situation changed with the time. After 31 cycles, generators G6-G9, which initially showed high association with instability, now have higher association with the stable templates, resulting in a correct prediction.

Figure 15:
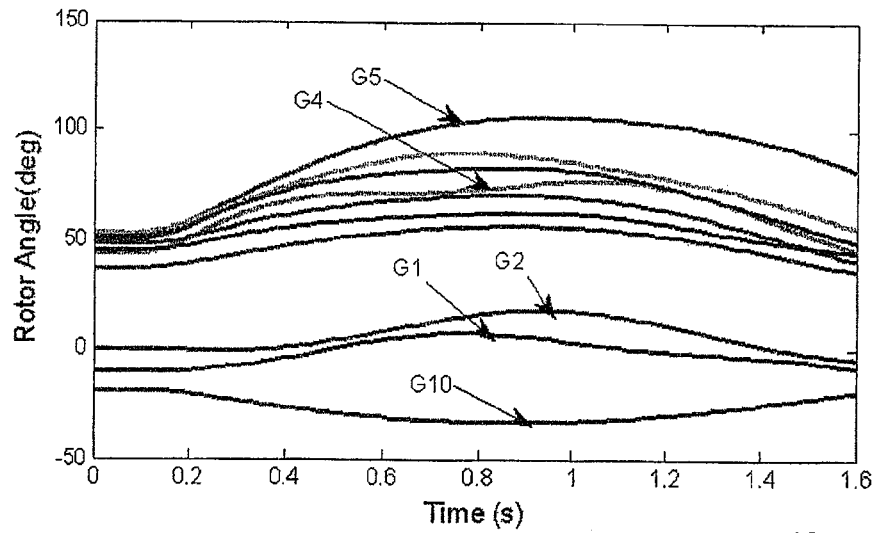
FIG. 15 is a graphical representation of generator bus phase angle variations after the fault in Case 3 noted above.

The generator phase angle variations shown in FIG. 15 suggest that Case 3 is a very marginally stable case: the phase angle difference between G10 and G5 reaches close to 150° at some point. It should be noted that shown are the phase angles of generator bus voltages; the angle difference between generator internal voltages would have reached very close to 180° at the above point. Considering this, it can be concluded that the system showed quite satisfactory prediction performance even under previously unlearned conditions. In practice, if a change of network topology or operation conditions is anticipated, new system simulations can be carried out and the predictor can be retrained. This is an offline process and should be able to achieve within the time frame of operational planning.

Practical Implementation Issues

Application to Practical Systems

When applying the proposed scheme to a practical system, the size of the network is an obvious concern. As illustrated in the example, use of the generator bus voltages is adequate for predicting the rotor angle stability status. This a good feature when consider the scaling up of the scheme, because the number of generator buses in a power system does not increase proportionately to the total number of buses.

In addition, improvements in the response time can be achieved by exploiting the distributed nature of the scheme. When the structure of the proposed scheme is examined, it can be easily noticed that it is not necessary to communicate all voltage measurements, which has to be done at the end of each cycle as assumed in this paper, to a central computer. The similarity to templates can be calculated locally and only the final results can be transmitted to the central computer which performs the classification. It is also possible to deploy several classifiers which take into consideration of the different template lengths. If a particular disturbance is progressively classified by several classifiers, that will increases the confidence of the prediction. This will help in situations such as Case 3 described in the previous section.

A novel method for predicting the rotor angle stability status following a large disturbance using post-disturbance voltage magnitude variations was proposed. A systematic procedure for designing the rotor angle instability prediction system was developed. Application of the method to the 39 bus test system showed that proximity of the post-fault bus voltage trajectories to pre-identified voltage templates are excellent features for predicting the future transient stability status. For the database considered in this study, the SVM classifier could predict the transient stability status with 100% accuracy for template windows ranging from 6 cycles to 36 cycles. The proposed system could predict the transient stability status satisfactorily even when the network configuration was altered from the original structure used for training the prediction system.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

References

[1] D. Tziouvaras and D. Hou, "Out-of-Step Protection Fundamentals and Advancements", Proc. of the 30$^{th}$ Annual Western Protective Relay Conference, Spokane, Wash., USA, Oct. 21-23, 2003.

[2] D. S. Kirschen, G. Štrbac, "Why Investments do not Prevent Blackouts", *The Electricity Journal*, Vol. 179 (2), pp. 29-36, March 2004.

[3] P. Kundur, J. Paserba, V. Ajjarapu, G. Andersson, A. Bose, C. Canizares, N. Hatziargyriou, D. Hill, A. Stankovic, C. Taylor, T. Van Cutsem, and V. Vittal", "Definition And Classification of Power System Stability, IEEE/CIGRE joint task force on stability terms and definitions, *IEEE Trans. Power Systems*, Vol. 19 (3), pp. 1387-1401, August 2004.

[4] N. Amjadi and S. F. Majedi, "Transient Stability Prediction by a Hybrid Intelligent System", *IEEE Trans. Power Systems*, Vol. 22 (3), pp 1275-1283, August 2007.

[5] M. Begovic, D. Novosel, D. Karlsson, C. Henville, and G. Nichel, "Wide-Area Protection and Emergency Control", *Proc. of the IEEE*, Vol. 93 (5), pp. 876-891, May. 2005.

[6] M. G. Adamiak, A. P. Apostolov, M. M. Begovic, C. F. Henville, K. E. Martin, G. L. Michel, A. G. Phadke, and J. S. Thorp, "Wide Area Protection—Technology and Infrastructures", *IEEE Trans. Power Delivery*, Vol. 21 (2), pp 601-609, April 2006.

[7] C. W. Taylor, D. C. Erickson, K. Martin, R. E. Wilson, and V. Venkatasubramanian, "WACS—Wide-Area Stability and Voltage Control System: R&D and Online Demonstration", *Proc. of the IEEE*, Vol. 93 (5), pp. 892-906, May. 2005.

[8] D. Hu and V. Venkatasubramanian, "New Wide-area Algorithms for Detecting Angle Stability Using Synchrophasors", *Proc. of the Western Protective Relay Conference*, Spokane, USA, 2006.

[9] I. Kamwa, J. Beland, and D. McNabb, "PMU-based Vulnerability Assessment Using Wide-area Severity Indices and Tracking Modal Analysis", *Proc. IEEE PES Power System Conference and Exposition*, Atlanta, USA, Oct. 29-Nov. 1, 2006.

[10] Y. Ohura, M. Suzuki, K. Yanagihashi, M. Yamaura, K. Omata, T. Nakamura, S. Mitamura and H. Watanabe, "A Predictive Out-of-Step Protection Based on Observation of Phase Difference Between Substations", *IEEE Trans. Power Delivery*, Vol. 5 (4), pp. 1696-1730, November 1990

[11] K. Yamashita and H. Kameda, "Out-of-Step Prediction Logic for Wide Area Protection Based on an Autoregressive Model", *Proc. IEEE PES Power Systems Conference and Exposition* 2004, New York, USA, 10-13 Oct. 2004

[12] C. W. Liu, M. C. Su, S. S. Tsay, and Y. J. Wang, "Application of a Novel Fuzzy Neural Network to Real-time Transient Stability Swings Prediction Based on Synchronized Phasor Measurements", *IEEE Trans. Power Systems, Vol.* 14 (2), pp. 1029-1035, May 1999.

[13] T. W. Laio, "Clustering of Time Series Data—A Survey", *Pattern Recognition*, Vol. 38, pp. 1857-1874, 2005.

[14] J. C. Dunn, "A Fuzzy Relative of the ISODATA Process and Its Use in Detecting Compact Well-separated Clusters", Journal of Cybernet, Vol. 3, pp. 32-57, 1974.

[15] J. C. Bezdek, *Pattern Recognition with Fuzzy Objective Function Algorithms*, Plenum Press, New York and London, 1987.

[16] S. Gunn, "Support Vector Machines for Classification and Regression", School of Electronics and Computer Science, University of Southampton, ISIS Technical Report, May 1998.

[17] C. W. Hsu, C. C. Chang, and C. J. Lin, "A Practical Guide to Support Vector Classification", Department of Computer Science, National Taiwan University, Taipei 106, Taiwan, 2008. Available: http://www.csie.ntu.edu.tw/~cjlin

[18] M. A. Pai, *Energy Function Analysis for Power System Stability*, Kluwer Academic Publishers, Boston/Dordrecht/London, August 1989.

[19] TSAT Transient Security Assessment Tool, DSA Tools, Powertech Labs Inc. Available: www.dsatools.com

[20] C. C. Chang and C. J. Lin, "LIBSVM: A Library for Support Vector Machines", 2001. Software available at http://www.csie.ntu.edu.tw/~cjlin/libsvm

The invention claimed is:

1. A method of monitoring a rotor angle stability condition in a power system comprising a plurality of generator buses, a phasor measurement unit associated with each generator bus so as to measure voltage magnitude of the generator bus in real time, and a phasor data concentrator arranged to receive the measured voltage magnitudes and archive the measured voltage magnitudes in synchronicity with one another in an archive database, the method comprising:

estimating a trajectory of a voltage magnitude for each of the generator buses by receiving the measured voltage magnitudes from the phasor data concentrator;

providing a database of stable templates and unstable templates in which the stable templates represent typical bus voltage magnitude variation patterns following a disturbance resulting in stable situations and the unstable templates represent typical bus voltage magnitude variation patterns following a disturbance resulting in unstable situations;

calculating a similarity value for each trajectory representing a similarity of the trajectory to the respective templates; and evaluating a combination of the calculated similarity values for a plurality of the generator buses to determine that the rotor angle stability condition of the power system is stable if the trajectories of the generator buses are similar to stable templates and to determine that the rotor angle stability condition of the power system is unstable if the trajectories of the generator buses are similar to unstable templates.

2. The method according to claim 1 including estimating the trajectory of the voltage magnitude for each of the generator buses for a prescribed number of cycles responsive to a detected fault condition.

3. The method according to claim 1 including estimating the trajectory of the voltage magnitude for each of the generator buses in synchronicity with one another.

4. The method according to claim 1 including calculating the similarity value for each trajectory by calculating a correlation measure or a distance measure over an entire length of each template.

5. The method according to claim 1 including generating the database of templates by recording bus voltage magnitude variation patterns following a plurality of simulated disturbances.

6. The method according to claim 5 including grouping the recorded patterns using a clustering algorithm such that each template represents a group of simulated disturbances.

7. The method according to claim 5 including using the generated database of templates to train a classifier algorithm and using the classifier algorithm to determine the rotor angle stability condition.

8. The method according to claim 1 including identifying a set of templates corresponding to stable and unstable situations for each generator bus.

9. The method according to claim 1 including identifying a common set of templates corresponding to stable and unstable situations associated with all of the generator buses.

10. The method according to claim 1 including applying a corrective action to the power system in direct response to determination of the stability condition being unstable.

11. A monitoring system for monitoring a rotor angle stability condition in a power system comprising a plurality of generator buses, a phasor measurement unit associated with each generator bus so as to measure voltage magnitude of the generator bus in real time, and a phasor data concentrator arranged to receive the measured voltage magnitudes and archive the measured voltage magnitudes in synchronicity with one another in an archive database, the monitoring system comprising:
a stability monitor in communication with the phasor data concentrator so as to be arranged to receive the measured voltage magnitudes and estimate a trajectory of the voltage magnitude for each of the generator buses; and
a template database comprising stable templates and unstable templates in which the stable templates represent typical bus voltage magnitude variation patterns following a disturbance resulting in stable situations and the unstable templates represent typical bus voltage magnitude variation patterns following a disturbance resulting in unstable situations;
the stability monitor being further arranged to calculate a similarity value for each trajectory representing a similarity of the trajectory to the respective templates and evaluate a combination of the calculated similarity values for a plurality of the generator buses to determine that the rotor angle stability condition of the power system is stable if the trajectories of the generator buses are similar to stable templates and to determine that the rotor angle stability condition of the power system is unstable if the trajectories of the generator buses are similar to unstable templates.

12. The system according to claim 11 wherein the stability monitor is arranged to estimate the trajectory of the voltage magnitude for each of the generator buses for a prescribed number of cycles responsive to detection of a fault condition.

13. The system according to claim 11 wherein the stability monitor is arranged to estimate the trajectory of the voltage magnitude for each of the generator buses for a prescribed number of cycles responsive to detection of a clearance of a fault condition.

14. The system according to claim 11 wherein the stability monitor is arranged to calculate the similarity value for each trajectory by calculating a correlation measure or a distance measure over an entire length of each template.

15. The system according to claim 11 wherein each template in the template database is representative of a group of related simulated disturbances.

16. The system according to claim 11 further comprising a classifier arranged to classify the similarity values according to unstable or unstable conditions to determine the rotor angle stability condition.

17. The system according to claim 11 wherein the template database includes a set of templates corresponding to stable and unstable situations in association with each generator bus respectively.

18. The system according to claim 11 wherein the template database includes a common set of templates corresponding to stable and unstable situations in association with all of the generator buses.

19. The system according to claim 11 in combination with a power system comprising a power system controller, wherein the stability monitor is in communication with the power system controller so as to be arranged to apply a corrective action to the power system in response to determination of the stability condition being unstable.

* * * * *